(12) United States Patent
Sulavka

(10) Patent No.: US 8,301,547 B2
(45) Date of Patent: Oct. 30, 2012

(54) TRADING SYSTEM

(75) Inventor: Mark Sulavka, New York, NY (US)

(73) Assignee: Openmatch Holdings LLC, Wilmington, DE (US)

( * ) Notice: Subject to any disclaimer, the term of this patent is extended or adjusted under 35 U.S.C. 154(b) by 0 days.

(21) Appl. No.: 13/160,591

(22) Filed: Jun. 15, 2011

(65) Prior Publication Data

US 2011/0246351 A1  Oct. 6, 2011

Related U.S. Application Data

(63) Continuation of application No. PCT/US2009/033370, filed on Feb. 6, 2009.

(60) Provisional application No. 61/141,106, filed on Dec. 29, 2008.

(51) Int. Cl.
*G06Q 40/00* (2006.01)

(52) U.S. Cl. .......................................... 705/37; 705/38
(58) Field of Classification Search ................ 705/35–39
See application file for complete search history.

(56) References Cited

U.S. PATENT DOCUMENTS

| | | | | |
|---|---|---|---|---|
| 7,505,935 B2 * | 3/2009 | Mendiola et al. | ................ | 705/37 |
| 2008/0065510 A1 * | 3/2008 | Yu | ................... | 705/27 |
| 2010/0179882 A1 * | 7/2010 | Rigole | ............................ | 705/26 |

* cited by examiner

*Primary Examiner* — Thu Thao Havan
(74) *Attorney, Agent, or Firm* — Michael J. Feigin, Esq.; Feigin & Associates, LLC

(57) ABSTRACT

A Computer apparatus configured to process transactions in fungible assets on behalf of account holders on a client controlled, order by order basis, via account controlled and configured private books of business and public books, as well as proactively route public orders to external venues based on analysis of account-specific best execution configurations including venue cost assignments and account-specific venue routing parameters.

22 Claims, 17 Drawing Sheets

Figure 2A

Account Setup Table 202

| AccountID | IMU | MTF | BXRouter | Price | FillRate | TimeRate | Destination |
|---|---|---|---|---|---|---|---|
| ACCTA1 | X | X | X | 3 | 2 | 2 | 1 |
| ACCTA2 | X | X | X | 1 | 1 | 1 | 1 |
| ACCTA3 | X | | | 1 | 1 | 1 | 1 |
| ACCTA4 | X | X | | 2 | 1 | 1 | 1 |

Figure 2B

IMU Setup 204

| IMU | ACCESS RULES |
|---|---|
| IMUA1 | ACCTA1, ACCTA2, ACCTA3 |
| IMUA2 | ACCTA1, ACCTA4 |

Figure 2C

Account Destination Setup 206

| AccountID | Venue | Preference | Order Type | Handler |
|---|---|---|---|---|
| ACCTA1 | L | 1 | 1 | RA2 |
| ACCTA1 | ST | 2 | 1 | RA2 |
| ACCTA2 | L | 1 | 1 | RA1 |
| ACCTA2 | ST | 1 | 1 | RA1 |

Figure 2D

Account Cost Matrix Setup 208

| AccountID | Cost Type | Contra | V1 | V2 | V3 | V4 | V5 | V6 | V7 | V8 | V9 | V10 |
|---|---|---|---|---|---|---|---|---|---|---|---|---|
| ACCTA1 | 1 | L | 0.075 | 0.234 | 11.72 | 0 | 0 | 0 | 0 | 0 | 0 | 0 |
| ACCTA1 | 1 | ST | 0.2 | 0 | 0 | 0 | 0 | 0 | 0 | 0 | 0 | 0 |
| ACCTA1 | 2 | ACCTA2 | 1 | 0 | 0 | 0 | 0 | 0 | 0 | 0 | 0 | 0 |
| ACCTA1 | 2 | ACCTA3 | 1 | 0 | 0 | 0 | 0 | 0 | 0 | 0 | 0 | 0 |
| ACCTA1 | 2 | ACCTA4 | 2 | 0 | 0 | 0 | 0 | 0 | 0 | 0 | 0 | 0 |
| ACCTA2 | 1 | L | 0.075 | 0.234 | 11.72 | 0 | 0 | 0 | 0 | 0 | 0 | 0 |
| ACCTA2 | 1 | ST | 0.2 | 0 | 0 | 0 | 0 | 0 | 0 | 0 | 0 | 0 |
| ACCTA2 | 2 | ACCTA1 | 1 | 0 | 0 | 0 | 0 | 0 | 0 | 0 | 0 | 0 |
| ACCTA2 | 2 | ACCTA3 | 1 | 0 | 0 | 0 | 0 | 0 | 0 | 0 | 0 | 0 |
| ACCTA3 | 2 | ACCTA1 | 1 | 0 | 0 | 0 | 0 | 0 | 0 | 0 | 0 | 0 |
| ACCTA3 | 2 | ACCTA2 | 1 | 0 | 0 | 0 | 0 | 0 | 0 | 0 | 0 | 0 |
| ACCTA4 | 2 | ACCTA1 | 2 | 0 | 0 | 0 | 0 | 0 | 0 | 0 | 0 | 0 |

Figure 3

Venue Setup

| VenueID | Venue Name |
|---|---|
| L | London Stock Exchange |
| ST | Stockholm Stock Exchange |

Figure 4

| INSTID | OMI | INSTNAME | BASECURR |
|---|---|---|---|
| 1 | AAAA | AAAA INSTRUMENT | EUR |
| 2 | AAAB | AAAB INSTRUMENT | EUR |
| 3 | AAAC | AAAC INSTRUMENT | UR |
| 4 | AAAD | AAAD INSTRUMENT | CHF |
| 5 | AAAE | AAAE INSTRUMENT | CHF |
| 6 | AAAF | AAAF INSTRUMENT | EUR |
| 7 | DAAA | DAAA INSTRUMENT | EUR |
| 8 | DAAB | DAAB INSTRUMENT | EUR |
| 9 | DAAC | DAAC INSTRUMENT | GBP |

Figure 5

Currency Exchange Rate Setup

| From CCY | To CCY | Exch Rate |
|---|---|---|
| EUR | GBP | 0.811804 |
| EUR | SEK | 9.46281 |
| EUR | USD | 1.436 |
| EUR | EUR | 1.0 |
| GBP | EUR | 1.23182 |
| GBP | USD | 1.7689 |
| GBP | SEK | 11.6565 |
| GBP | GBP | 1.0 |
| SEK | EUR | 0.105677 |
| SEK | GBP | 0.0857889 |
| SEK | USD | 0.151752 |
| SEK | SEK | 1.0 |

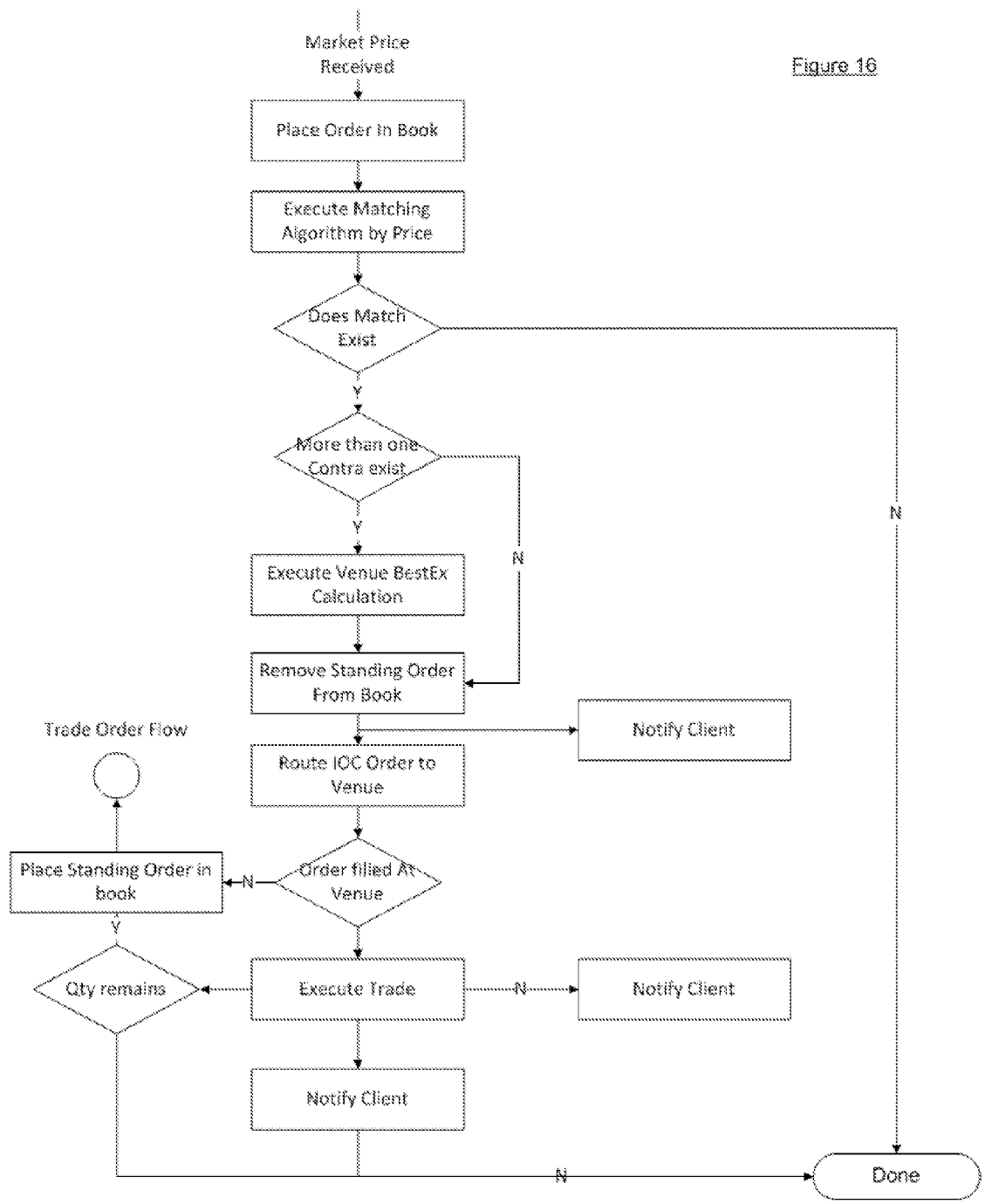

TRADING SYSTEM

FIELD OF THE INVENTION

The present invention relates to a computer system for facilitating transactions involving fungible assets, particularly types of financial instruments, such as shares (or equities), bonds, warrants and other financial products, and more particularly to transactions involving equities and equity options.

BACKGROUND OF THE INVENTION

Exchange of goods or services by way of introducing buyers and sellers is the function of markets. The participants within markets exchange goods or services for economical benefit. Initially markets operated using the model of in person, human to human communication of buy and sell orders. With the evolution of computer systems, communication of buy and sell orders have increasingly been implemented using the computer system. This new type of market is commonly, but not exclusively, referred to as electronic trading.

Electronic trading methods use various types of computer systems to facilitate transactions between a buyer and a seller. In principal each transaction is effected by participants with authorised access to the computer system. The methods, and therefore the computer system, define the scope of actions the participants can employ to match buy and sell orders.

No previously known technology has afforded participants full control and the ability to create new controls, in a concurrent holistic manner, over their counterparties, economic interest and information distribution when performing trade executions.

The apparatus and methods disclosed herein constitute an improved transaction computer system for facilitating transactions of financial instruments. In particular, the embodiments of the invention provide a client-specific configurable Internal Matching Utility (IMU) affording a client the ability to define and manage control over counterparties, economic interest and information distribution.

SUMMARY OF THE INVENTION

According to embodiments of the present invention, there are provided several apparatus, methods and computer readable media as set out in the description and appended claims.

According to an aspect of the present invention, there is provided computer apparatus configured to process transactions in fungible assets on behalf of account holders on a client controlled, order by order basis, via account controlled and configured private books of business and public books, and to proactively route public orders to external venues based on analysis of account specific best execution configurations. The apparatus being provided with a matching engine including an internalised matching utility for conducting transactions on account defined private books of business, in addition to public books of business, the computer apparatus comprising: operation files comprising configuration information including account holder rules and preferences, and wherein said rules comprise definitions of private book relationships defined in terms of eligible private book counterparties per account holder identity; an operation file configuration interface configured to establish private book relationships and define deal criteria applying between eligible private book counterparties; a volatile memory configured for receiving and holding in-memory book of business data, including private book data, market data from external venues, and other relevant data based on information within orders; a matching engine comprising an internalised matching utility processor configured to parse the private book data in the volatile memory according to account holder rules and preferences.

Other aspects of the invention are set out in claims 2-22.

According to one aspect of the disclosed systems and methods, users are empowered with the ability to configure private books of business on an end-to-end level. Hence, within each user-configurable private pool of liquidity, each client is able to list and administrate transaction preferences relating to, for example, priority among eligible counterparties.

According to another aspect, the herein provided systems and methods enable clients to specify transaction path preferences to external venues. For example, clients are able to designate interim entities, in varying degrees of preference, for transactions routed to external venues such as banks, MTFs, ATSs and ECNs.

Certain embodiments of the invention are advantageous in that they are not database driven. Implementation as a core in-memory book with key elements running as separate threads capable of reading and writing to the various files and other in-memory data has technical advantages, for example in terms of speed and data recovery.

Certain disclosed embodiments have an order book in memory and certain predetermined operating files may be preloaded. Selecting which files (if any) are preloaded is a configurable part of the system and may vary from one application to another. Separate threads may include for example: orders in and staging thereof; backup and recovery; outgoing messages; price dissemination. In use of one embodiment, operating files or portions of operating files defining one or more of: eligible contra parties by account holder; eligible IMU contra parties by account holder; contra party preferences by account holder; account-based cost preferences for various types of trade; account-based cost preferences for various counter parties; account-based cost preferences for various venues; venue-based preferences; default eligibility to trade on IMU; default eligibility to trade on MTF; and default eligibility to trade on external venues with venue-based best execution cost preferences.

According to other apparatus and methods embodying the present invention, in use, data on one or more the following are preloaded into memory during a trading session: eligible contra parties by account holder; eligible IMU contra parties by account holder; contra party preferences by account holder; account-based cost preferences for various types of trade; account-based cost preferences for various counter parties; account-based cost preferences for various venues; venue-based preferences; default eligibility to trade on IMU; default eligibility to trade on MTF; and default eligibility to trade on external venues with venue-based best execution cost preferences.

According to other apparatus and methods embodying the present invention, in use, data on one or more the following are called into memory during a trading session in dependence on an order to be processed: eligible contra parties by account holder; eligible IMU contra parties by account holder; contra party preferences by account holder; account-based cost preferences for various types of trade; account-based cost preferences for various counter parties; account-based cost preferences for various venues; venue-based preferences; default eligibility to trade on IMU; default eligibility to trade on MTF; and default eligibility to trade on external venues with venue-based best execution cost preferences.

The various embodiments of the present invention provide an integrated solution to sophisticated transaction processing involving different types of trading relationships, reducing the need for separate, secure platforms between private counterparties. The various embodiments of the present invention also minimise network transactions, making the processes involved more efficient. Furthermore, the various embodiments of the present invention entitle a given user access to the best available execution mode over a combination of live markets over time.

Certain embodiments facilitate trades, particularly internalised trades between counterparties, that would not otherwise be possible whilst at the same time mitigating unnecessary processing and message traffic within the system and wider network.

Disclosed computerised trading apparatus and methods support selective transaction scope across (i) internalised counterparty relationships, (ii) a multilateral trade facility, and the (iii) best execution external venue taking into consideration account external venues based on account holder's configured relationships and network parameters. Embodiments of the invention support trades and combinations of different types of trades across internalised pending orders that are not possible outside the system, ensuring price optimisation, reducing the number of processing steps and minimising message traffic.

Certain embodiments disclosed introduce an internalised matching utility (IMU) and control system configurable to define allowed internalised counterparty relationships. Preferred embodiments define multiple permitted counterparties by account so that a relatively complex network of permitted trades (particularly internalised trades) can be defined. For example, Account A may be permitted to trade with Accounts B and C, whereas Account C may only be permitted to trade with Account A but not with Account B.

In use, one embodiment maintains a book in-memory. New orders are represented with price and entry time. Each order has a flag indicating at least one of the following apply: IMU eligible; MTF eligible; and best execution router eligible. One or more of these flags can be set individually within an order, alternatively, or in addition, one more of the flags can take a account-based default value stored in an operation file. In general, flags set by order override flags set by default whilst not allowing an order scope broader than what is permitted by the Account flags.

In general, orders are sorted by limit price such that higher prices are matched first for sell orders, and lower prices matched first for buy orders.

In one embodiment, where flags of an order indicate multiple eligibility as between two or more of IMU, MTF and best execution routing to external venues, internalised orders are matched first. Potential contras for internalised orders are filtered based on internalised group eligibility, specifically to establish counterparties belonging to internalised groups including the account placing the order. If multiple internalised counterparties exist at the same price, the system references the operation file and determines the internalised transaction preferences of the account holder. If that does not yield a suitable match, orders may be matched on a first-in first-out basis.

Preferably, orders eligible for MTF processing are matched second. If multiple contra orders exist at the same price within the MTF, orders are matched on a first-in first-out basis.

In the disclosed embodiment best execution exchange orders are matched last. If multiple contra orders exist at the same price at different venues, the best execution processor uses account-specific venue cost preference data applying in respect of the relevant account to determine the order in which external venue orders are matched.

Various embodiments of the invention provide several advantages over previously known technology, for instance, providing participants with the ability to wholly define and regulate participation within their own IMUs between approved trading counter-parties, ability to simultaneous gain exposure to multiple matching opportunities via other participant's or groups of participants' IMUs, and ability to perform controlled executions against previously restricted market participants disallowed due to regulatory or an account holder's compliance constraints.

The apparatus and methods disclosed herein provide privileged interaction groups each defined and controlled in a multifaceted manner by each participant as per their demands on interaction relationships. The nature of interaction is based on, but not exclusively, counterparties, economic interest and information distribution. It is the ability to create an unbounded number of relationships, with each other participant having the same ability, thus creating a dynamic matrix in one continuous market.

In addition, the embodiments of the invention provide account holders previously unavailable levels of control on an order by order basis over cost and routing preference attributes when routing orders exposed to the other transaction environments.

In electronic transactions involving financial instruments such as shares (or equities), bonds, warrants, synthetics, derivatives, and other financial products, the computer systems for matching buyers and sellers are provided by traditional stock exchanges and new non-traditional trading environments often referred to, but not exclusively, as Alternative Trading Systems (ATSs), Electronic Communications Networks (ECNs) or Multilateral Trade Facilities (MTFs). One of the most marked changes has been in the Equities markets where, through provision of competitive value propositions, ATSs/ECN's/MTF's have gained an increasing share of transaction volume.

Collectively, traditional exchanges, ECNs, MTFs, and ATSs are referred to herein as trading "venues". In other words, a trading venue is an electronic system that brings buyers and sellers together for the electronic execution of trades.

Asset administrators, stock brokers or investment bankers with access to venues capable of buying/selling instruments are referred to collectively herein as "brokers".

Additional advantages and novel features of the invention will be set forth in part in the description which follows, and in part will become apparent to those skilled in the art upon examination of the following and accompanying drawings or may be learned by practice of the invention.

BRIEF DESCRIPTION OF THE DRAWINGS

For a better understanding of the invention and as to how the same may be carried into effect reference will now be made, by way of example only, to the accompanying drawings, in which:

FIG. 2A shows more detail of an account setup table according to embodiments of the present invention;

FIG. 2B shows an IMU Setup Table according to embodiments of the present invention;

FIG. 2C shows more detail of an account destination setup table according to embodiments of the present invention;

FIG. 2D shows more detail of an account cost matrix setup table according to embodiments of the present invention;

FIG. 3 shows an example of a typical Venue Setup file according to embodiments of the present invention;

FIG. 4 shows and example of an "Instrument Master File" according to embodiments of the present invention;

FIG. 5 shows an example of the Currency Exchange Rate Setup File according to an embodiment of the present invention;

FIG. 16 shows a typical process carried out when the system receives a market price according to embodiments of the present invention.

Like reference numerals appearing in the appended drawings are to be interpreted as representing functionally equivalent features described throughout this specification, unless otherwise stated.

GLOBAL DEFINITIONS

---

OrderValueEUR = Quantity * Price * ConvRateToEUR
OrderValueGBP = Quantity * Price * ConvRateToGBP
OrderValueSEK = Quantity * Price * ConvRateToSEK
ConvRateToXXX - End Of Day value to convert from currency equity is traded to XXX
  MinMax( val, min, max )
    if val < min      min
    if val > max      max
    else              val
  Cap( val, max )
    if val > max      max
    else              val

---

Exchange Calculations
London Stock Exchange
Total Trade Fee=(0.01+MinMax(OrderValueGBP*0.001*FeeRate, MinFee, MaxFee))*FX Conversion Rate to EUR FeeRate, MinFee and MaxFee are Static Daily Values set by the user within Account Cost Matrix Setup as V1, V2, and V3.

Stockholm Stock Exchange (Nordic Exchange)
Total Trade Fee=5.30 SEK+(Cap(OrderValueSEK*0.000046, 440 SEK)*DiscountPercent)*FX Conversion Rate to EUR DiscountPercent is a Static Daily Value set by the user (e.g. 0.20 for 20%) within Account Cost Matrix Setup as V1

DETAILED DESCRIPTION

Those skilled in the art will appreciate that while this disclosure describes what is considered to be the best mode and, where appropriate, other modes of performing the invention, the invention should not be limited to the specific configurations and methods disclosed in this description of the preferred embodiment.

Figure 1:
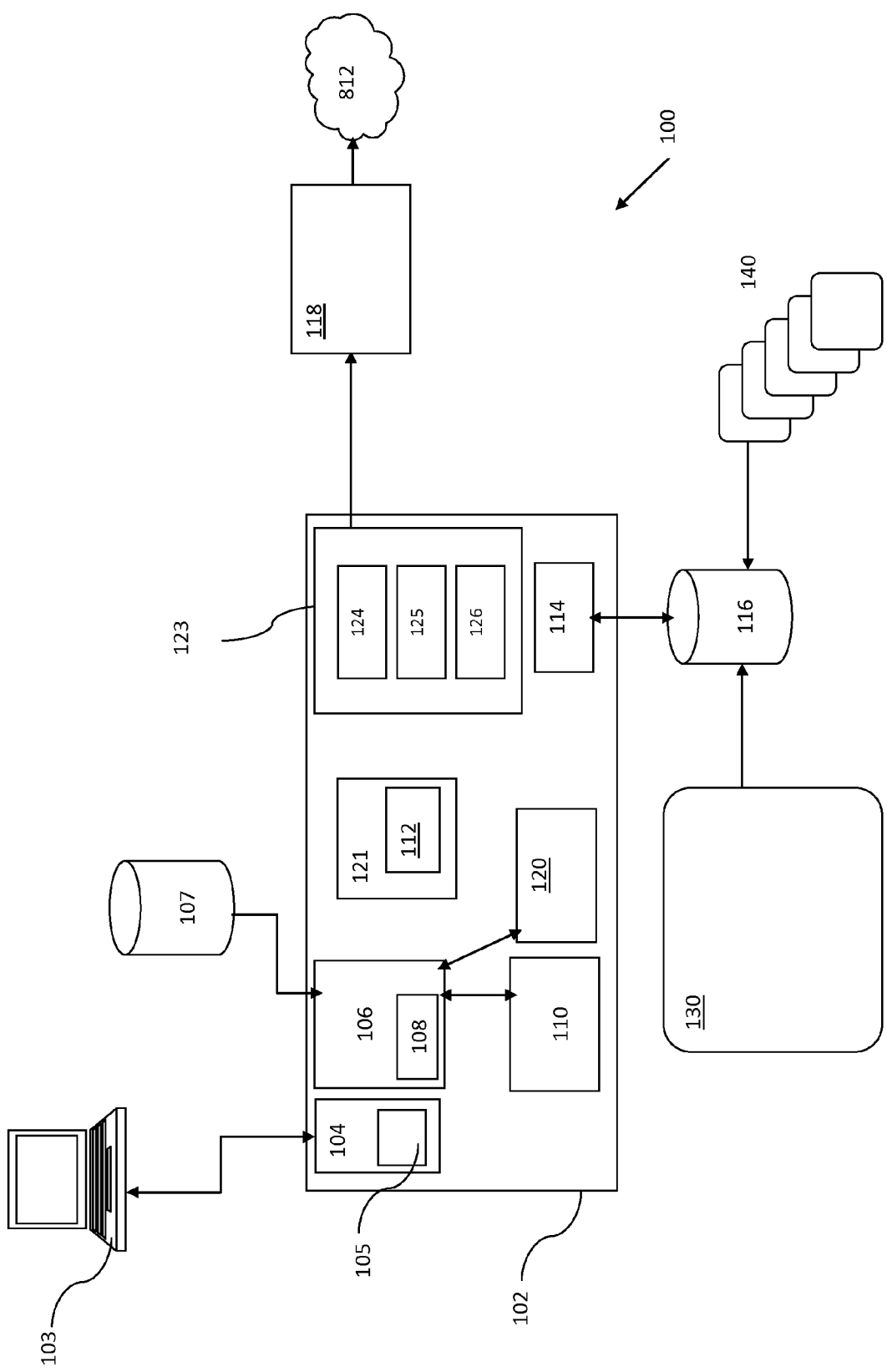
FIG. 1 shows a trading computer system according to an embodiment of the present invention.

FIG. 1 shows a trading computer system according to an embodiment of the present invention 100. The trading computer system 100 comprises a central server 102 and at least one client terminal 103 in communication with the server 102. According to an embodiment of the invention, the central server 102 is configured as an application service provider (ASP) for transactions involving financial instruments. According to other embodiments, however, it may be configured for transactions involving other fungible assets. More specifically, the central server 102 comprises the following server elements: a client interface 104, a matching processor 106, an internalised matching utility (IMU) processor 108, a book manager 110, an integrator 114, a main database 116, a disseminator 118, a best execution cost engine 120, a main memory 121 comprising an in-memory book datastore 112, and a dynamic order management module (DOMM) 123.

The main database 116 holds a plurality of user accounts belonging to clients. These clients are termed "account holders", and, according to certain embodiments, are clients wishing to carry out transactions of financial instruments. Account holders will generally be brokers, banks or other regulated firms. Once a client account has been created, e.g. through a web-interface or other input means, a client can log into their account using an appropriate access device such as a personal computer, thin client terminal, mobile handset, or otherwise, and place transaction orders with the server 102. The client is usually verified before being granted access to their account. According to one embodiment, client identity is verified using a username/password combination, for example, through a web or other user interface. According to another embodiment, a physical security measure such as a digital token is used to verify a client. However, other verification means and methods may be used as required.

The client interface 104 is operable to receive client-initiated orders. These orders (also termed "trade orders") may be, for example, order to buy instruments, sell instruments, cancel a previously submitted order, replace a previously submitted order, or a combination of these. These are often termed collectively as a "trading session".

The interface 104 is configured to receive trade orders encoded in the Financial Information exchange (FIX) protocol, the industry standard for the exchange of information related to financial instruments such as securities transactions. However, although the FIX protocol is convenient and preferable in many instances, the embodiments of the present invention are not specifically limited to the FIX protocol and other protocols may also be used alternatively or in addition, as appropriate for the tradable assets in question.

The interface 104 further comprises a translator 105, where necessary, for translating FIX (or other message protocols where applicable) encoded orders into another format for internal use within the server 102.

The client interface 104 is operable to connect to one or more client terminals 103 by a suitable communication link, e.g. via the internet or by some other network infrastructure, thus enabling communication between a client situated at the client terminal and the server 102. According to one embodiment, data is sent by clients to the interface 104 through special-purpose client software provided by vendors of software certified to interact electronically with system 100 running on client terminal 103. According to another embodiment, there is no requirement for software integration on the client terminal and data can be sent from a client to the interface 104 through a web interface using, for instance, secure HTTP (HTTPS), or otherwise.

The at least one client terminal is, according to one embodiment, a personal computer located at a site remote from the server 102. Preferably, however, the terminal is an order management system configured specifically for order entry and processing. The terminal may alternatively be a wireless device such as a PDA or other electronic computer equipped with a suitable interface. In any event, the terminal 103 is used by clients, in whatever capacity, to enter information concerning a proposed transaction. The client software, or web interface, running on terminal 103 is capable of initiating generation of order messages, typically in FIX format, in response to client inputs. This information may include, but is not limited to, indicators of the following: the instrument being traded; whether it is a buy/sell transaction; the number of instruments involved; price conditions; timing and/or duration of the order (including desired trade date and settlement date); the type of order; a set of flags, or other indicators, indicating the scope(s) of the order; a desired execution venue; account details for settlement; and client identity.

According to one embodiment of the invention, the client interface 104 is further operable to receive client configuration instructions for populating one or more operation files 140. The operation files 140, and the various methods by which they are generated according to embodiments of the invention, are described in more detail below.

The matching processor 106 is an intelligent computer processor with multi-parameter capabilities, configurable to reflect one or more pre-defined setup and configuration parameters, in this case stored at least in part in operation files 140. Broadly, the matching processor is operable to ensure rapid and accurate matching of buyers and sellers in order to conclude a transaction/trade session. The matching processor is capable of handling the matching of large numbers of bids and offers between market participants, or optionally routing orders to an external venue, such as an exchange, ECN, or alternate ATS, if deemed as the most competitive alternative based on best execution criterion. In this context, therefore, the process of matching refers to the process of computing suitable or most desirable destinations for transaction orders.

The matching processor 106 operates on a set of matching configurations that are either (i) statically specified in advance (static), e.g. by an account holder or by the system administrators and stored in one or more operation files 140, or (ii) dynamically generated in response to outputs of other system processes and stored in in-memory data store 112, or (iii) a combination of both. According to one example, matching parameters may be specified on the individual order, overriding any static defaults specified in advance.

According to one embodiment, the matching parameters are determined, at least in part, from data contained within operation files 140. The static parameters used by the matching processor 106 for matching of orders can be based on any number of factors, as will be evident from the detailed description of the operation files 140 below. Dynamically generated runtime parameters may take into consideration analysis performed on present or historical market conditions, outputs of previous transactions and/or any other calculated data.

The matching processor 106 is logically linked to an algorithm library 107, preferably existing as in-memory application code, but may also exist in some other datastore. The algorithm library comprises a suite of proprietary algorithms suitable for matching transactions. Each algorithm comprises a set of well-defined instructions for completing a matching task when given an initial set of values and parameters, usually reflecting a most desirable outcome of a transaction. The matching processor 106 is also operable to modify one or more of the algorithms based on information contained in a client order message and/or on client-specified setup parameters contained in the operation files 140.

The dynamic order management module (DOMM) 123 facilitates and manages order executions. The DOMM 123 comprises a request processor 124 for capturing input orders from interface 104 and an order processor 125 for routing said orders to pre-established destinations within server 102. The DOMM has access to main memory 121.

Figure 9:
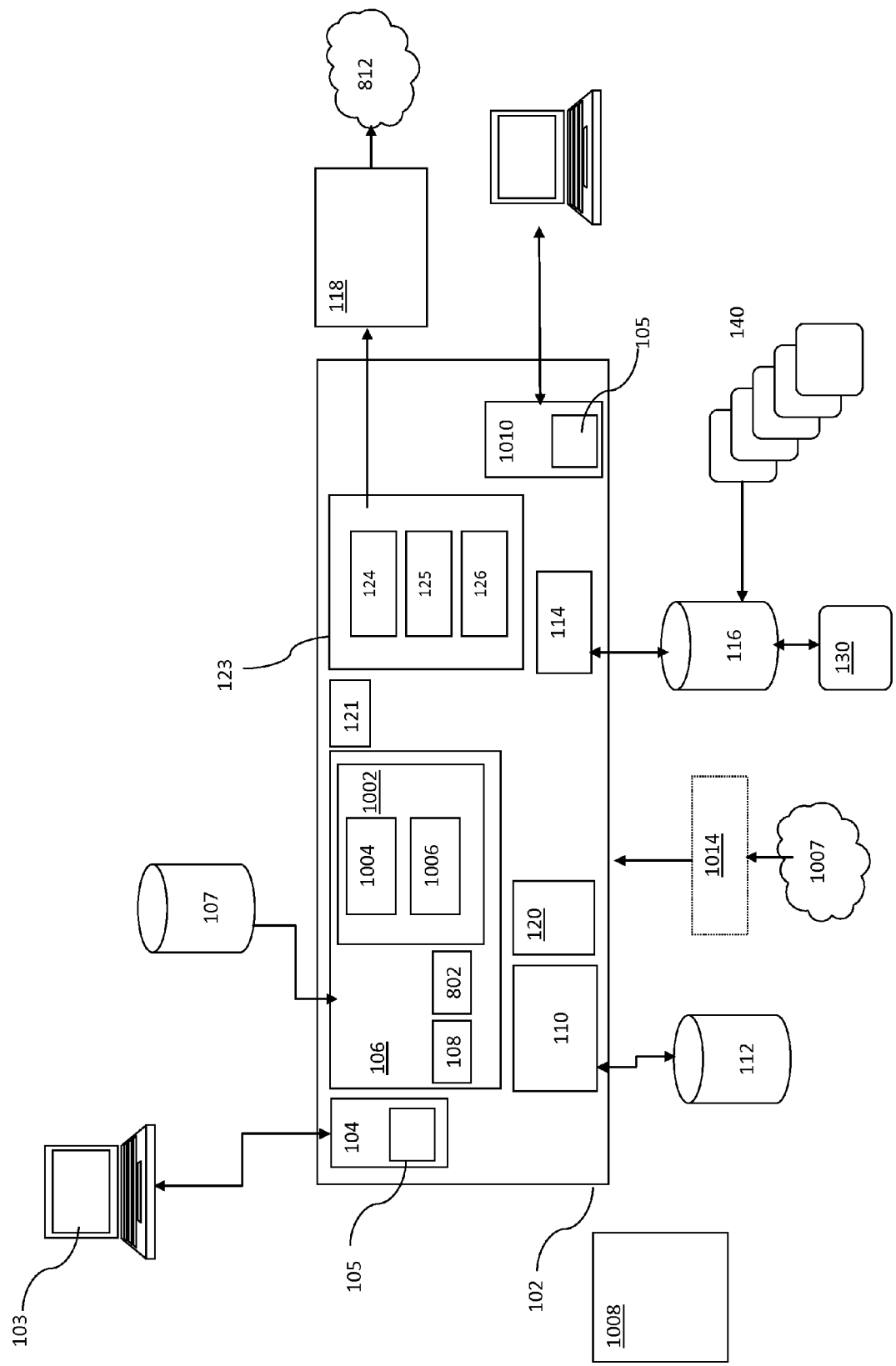
FIG. 9 shows another embodiment of the present invention, with the inclusion of among other processors, a BX Router processor.

One use of the memory 121 is to store the one or more operation files 140, as well as real-time market data and book data, enabling rapid processing of transaction requests by matching processor 106 or routing processor 1004 (see FIG. 9). Most typically, memory 121 is a volatile memory such as a Random Access Memory (RAM) however other types of memory may be used where appropriate.

In operation, the request processor 124 validates and appropriately packages an order by identifying the account holder identity and transaction type from the order message, e.g. from data contained within the FIX order message as received at the interface 104. In response to the identified order type, the request processor 124 generates an instruction enabling the order processor 125 to route an offer or bid to a predetermined destination within server 102, i.e. to the relevant sub-process (also referred to as a "plug-in"). According to preferred embodiments, this routing is done with a consideration of one or more attributes stored in operation files 140 specified at least in part by account holders.

However, according to an embodiment of the invention, the transaction type may not be specified within the order message and instead may be pre-defined by an account holder and/or the system administrators as a default and stored in the one or more operation files 140 (e.g. see FIGS. 2-5). In which case, the request processor 124 looks up the operation file from main memory 121 when the client places an order, by cross-referencing the account ID contained within the order message with the account ID in the relevant operation file, and instructs the order processor 125 to route the order to the correct sub-process according to the default.

There are several transaction or order types used according to embodiments of the present invention. Generally transaction types are categorised into one or more of the following types: "proactive", "passive", "dark" and "displayed". However, these are only provided as examples of transaction types and it will be clear to the skilled person that other categories of transactions may be defined as required.

Taking the above examples, a proactive order, according to embodiments of the present invention, is one which stipulates the client wishes to execute an order by the best execution means available, and therefore wishes for the central server 102 to proactively fulfil the order utilising all available resources. In this example best execution may take into account one or more of: price; expected speed of execution; likelihood of execution; various types of cost; and the like.

A passive order, by contrast, may be limited entirely to a specific location or sub-process. For example, a client may specify that a certain order should be transacted using only certain IMUs or MTFs and, if these are not available for order execution, that the order is cancelled or queued as a standing order for future processing.

A dark order is one which is not publicly displayed, or the amount/type of data concerning the order made available to others is limited in some way.

A displayed order is publicly displayed with information relevant to the transaction, e.g. the client, the amount of equities traded, and other related information. Published information includes both pre- and post-execution with regards to orders requested and/or executed.

Although these types of orders are provided by way of example, other types of orders may also be specified, or the account holder may define additional order attributes. For example, the order may be an "Immediate Or Cancel Order" (IOC), i.e. an order requiring that all or part of the order be executed immediately after it has been brought to the market, and a "Fill or Kill" (FOK), i.e. an order to fill a transaction immediately and completely or not at all.

The order processor 125 manages the "book". In the context of embodiments of the present invention, the book is a real-time record of orders and, where applicable, the details of the orders kept over a period of time, for instance one day, several hours etc., held in a suitable format. According to a preferred embodiment, the book resides in an in-memory datastore 112. However, according to alternative embodiments the book may reside in another, separately maintained, datastore. The details of a trade typically include such things as the time, price, order size and a specification of whether it is a buy or sell order. In addition, such records may be archived, for example, in main database 116 and kept indefinitely, or deleted after a certain amount of time. This archive of records may be utilised for several purposes, including data analysis of orders over a given period of time.

When an order is successfully executed through the server 102, the order processor 125 updates the book and typically sends an execution report to the initiating account holder, and/or the fulfilling party. The order processor 125 may additionally comprise means for generating reports which contain data from the book, including detail on all open orders and on previously completed orders, which can be viewed by account holders, for instance, using a personal computer equipped with a web browser and/or terminal 103. Additionally, the order processor 125 is linked to a disseminator 118 by a suitable data connection so that orders from the book can be published once completed, where necessary (i.e. where the order is a displayed order). In effect, therefore, the disseminator 118 is a data relay means operable to publish data regarding transactions and displayed orders standing within IMUs and/or MTF of the embodiments of the present invention to one or more subscribers 812.

According to embodiments of the invention, various elements of the server 102 are driven, in part or in full, by one or more operation files 140. Each of the operation files is populated with data stored in the main database 116 and is loaded into main memory 121 as required during a trade session. Examples of the overall contents and function of each of the operation files is described below, and the operational purpose of each file will become evident having regard to the description of the various server 102 elements, which follows.

Figure 2:
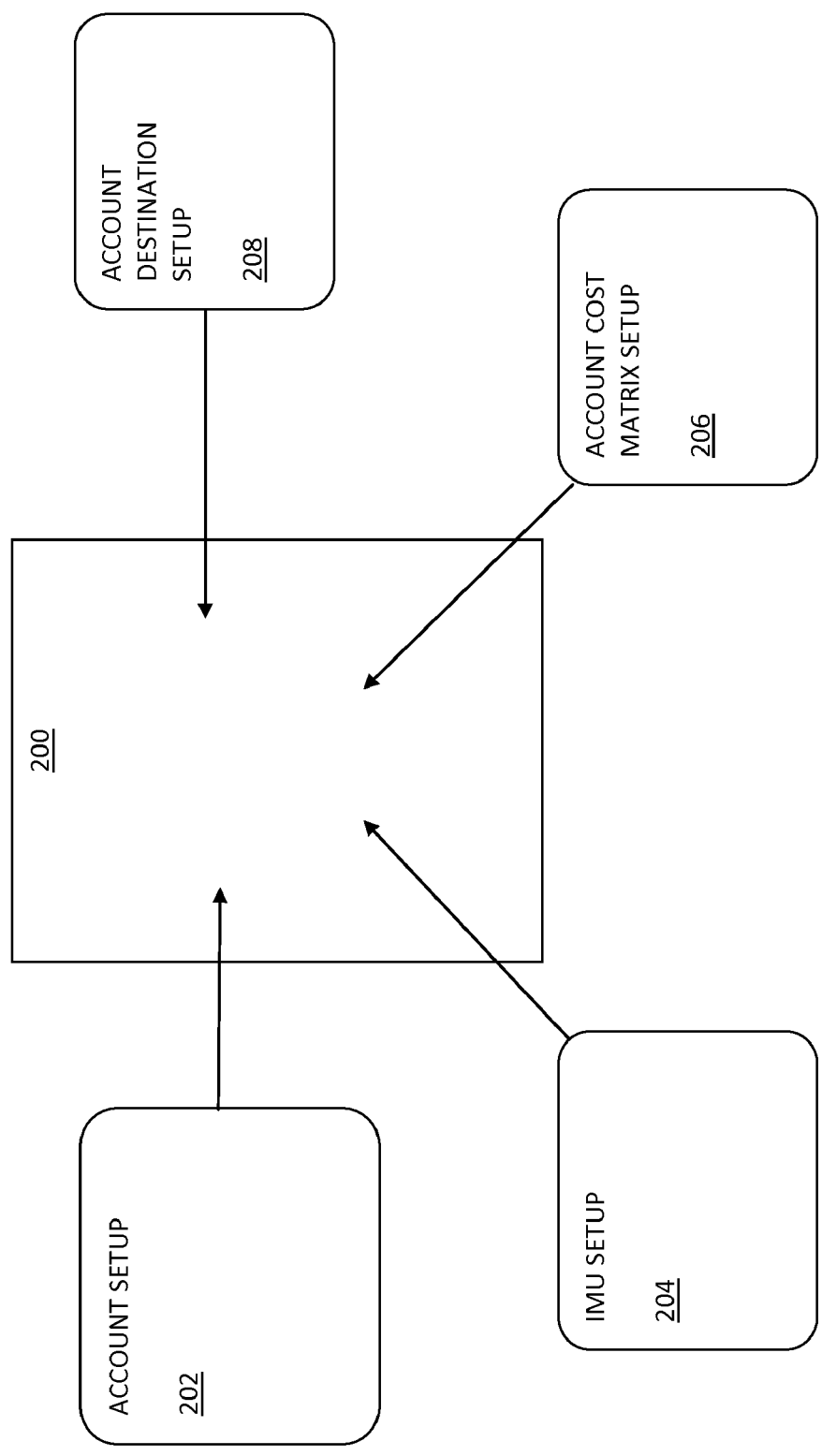
FIG. 2 shows an example of a typical "Account Matrix" used according to embodiments of the present invention for processing client orders.

FIG. 2 shows an example of a typical "Account Matrix" 200 used according to embodiments of the present invention for processing client orders. The Account Matrix comprises an Account Setup Table 202, IMU Setup Table 204, Account Cost Matrix Setup Table 206 and Account Destination Setup Table 208.

FIG. 2A shows more detail of the account setup table 202. Upon registration with the central server 102, each client is assigned a unique account code which is stored in the account setup table 202 and used within server 102 to identify clients, define relationships between clients and route client orders. The account setup table contains a list of all eligible accounts residing on server 102, and associates the unique account code (AccountID) with various attributes including, but not limited to: whether the account can participate in IMU, MTF and/or BX router transactions; Price attributes; FillRate; TimeRate; and destination. Those skilled in the art will appreciate that while this disclosure has described what is considered to be the best mode additional criterion may be available as available. All of these are described in more detail below.

FIG. 2B shows the IMU Setup Table 204. The IMU Setup Table governs the associations between one or more Account IDs, and thus between one or more account holders. The associations between them form one or more internalized matching utilities (IMUs). The functionality of IMUs is described throughout but, broadly, an IMU constitutes a "private book of business". In financial terms, a book of business is a portfolio of financial instruments held by an account holder, such as a brokerage or bank. According to the embodiments of the present invention, private books represent a private pool of liquidity for which an account holder and/or system administrator can define, control access and organize in terms of configurable attributes. Liquidity, in this context, refers to the fact that an asset or security can be bought or sold in the market without affecting the asset's price. Each private book allows, for example, internalised order flow configurable among a plurality of entities, for instance between multiple divisions within the same firm, sponsored firms, and/or firms between which there exists a strategic relationship. As will become evident, the private books according to embodiments of the present invention may be defined and configured in any number of ways, often with complex interrelations between them.

The pool of liquidity represented in a private book can also be termed a "dark pool of liquidity" or simply "dark pool". These terms are well-known in the art, and refer generally to trades of instruments which are carried out away from central exchanges and are not fully disseminated to the public. In the context of the present invention, "dark" orders or transactions thus refer to transactions where the nature of the transaction and/or the identity of the trading client are not disseminated through the disseminator 118 and remain fully internalised.

As will become evident from the description which follows, the systems and methods of the present invention enable account holders to specify order type/attributes on an order-by-order basis. However, typically only orders exposed to the IMU or MTF processors can stipulate whether the order is displayed or not displayed (dark).

Thus, an IMU utilised according to embodiments of the present invention is an electronic "pool of liquidity" containing fungible instruments that is exclusively shared between multiple account holders who, in agreement, consent to participate in the exchange of fungible instruments between themselves, prior to the order being made available to the general marketplace. In this regard, the order is said to be fully internalised. Once the agreement between the account holders is validated, the central server 102 may provide an initial preferential priority between the account holders when determining a suitable counter-party to an order request received. However, thereafter, interactions between the account holder and defined counterparties are fully configurable by the account holder. According to one embodiment of the invention, preference will be given to transactions carried out through private books using the IMU before being routed for further processing at other venues.

As shown in the exemplary IMU Setup Table in FIG. 2B, the table comprises the following fields: IMU ID, which identifies the IMU(s); and Access Rules which associate one or more Account IDs with other counter-party Account IDs, within a single IMU. In other words, each internal matching utility, defined with an IMU ID (e.g. IMUA1, IMUA2 etc.), uniquely identifies the private IMU group defined by the associations between account ID and counter-party account ID.

Broadly, the relationships defined in the IMU Setup Table 204 constitute access permissions for internally matching trades of financial instruments. Each IMU identified by an IMU ID is in essence a separate, private liquidity pool comprising plurality of account holders, controlled (in terms of access and configuration) by one or more of the account holders and/or system administrators. Thus, each IMU contains a plurality of account IDs grouped together such that they are representative of different relationships, e.g. these relationships may represent divisions within the same firm, sponsored firms, and/or firms between which there exists a strategic relationship. Although these are provided as simple illustrative examples, more complex relationships may be built up using the configurable IMUs utilising the system and methods of the present invention.

Each client identified by a unique account ID (see table 202) has a book of business representing fungible assets. Hence, upon creation, each account ID is logically associated with a book of business of the relevant account holder. By grouping related account IDs into one or more separate IMUs, for example in the manner shown in table 204, each of the client books associated with these account IDs is effectively pooled into a single book. This constitutes a private book in which, for example, orders can be matched according to priority on an independent and neutral platform outside a firm's "Chinese wall", maintaining order integrity and ensuring compliance with order conflict policies/procedures, for instance those instituted under MiFID.

According to one embodiment of the invention, the IMU Setup Table, and thus the permissions defined by the IMU(s), is fully configurable by account holding clients (account holders) based on preference. However, the attributes of the IMUs may also be defined by the system administrators, at least in part.

Figure 11:
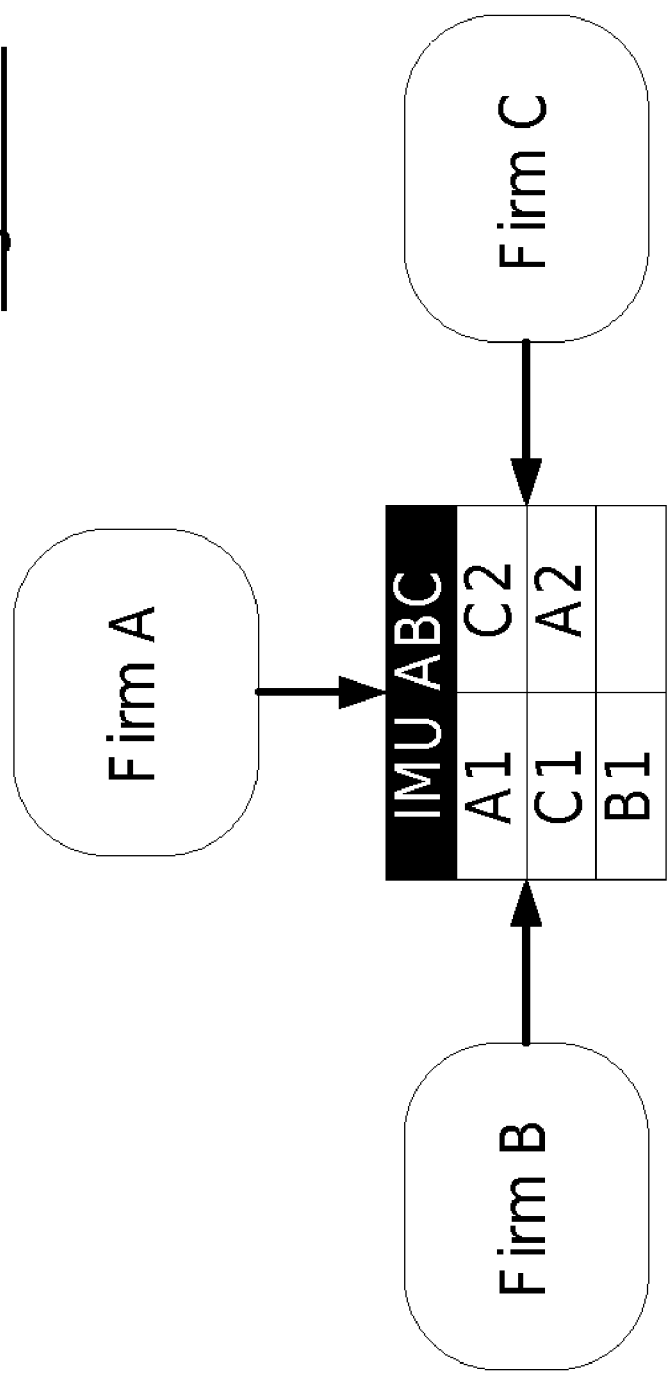
FIG. 11 shows an example of the IMU setup for a controlling account with one IMU for all permissioned counter-parties.

According to one embodiment of the present invention, the system and methods provided are particularly advantageous over previously known technologies and methods in that account holders are given full control over their IMUs, and hence how orders are executed against eligible counterparties. This includes, for instance, giving the account holder the ability to wholly define and regulate participation within their own IMUs between approved trading counter-parties. An example of how this participation works is shown in FIG. 11. According to this example, Firm A controls one IMU (ABC), with Firms B and C as approved counter-parties. The IMU (ABC) is setup and controlled by Firm A, typically through a client interface e.g. a web interface presented when the account holder securely logs into their account, performed by a System Administrator based on the authorized approval provided by the Account holder, or by some other suitable means. Firm A then specifies Firms B and C as eligible counterparties and gives these parties access to the IMU accordingly. With the IMU and access permissions defined and agreed, Firm A can execute orders against Firms B and C. Likewise, Firm B may be given permission to execute orders against Firm C. In this regard, the interaction between parties making up an individual IMU are fully configurable by the account holder.

According to one embodiment, by participating in an IMU, all participants can execute against all other parties within the IMU and there are no further restrictions among this subset, other than the ability to assign a priority to each. According to one example, the priority set high, ultimately minimizing the possibility of execution but there could still be an opportunity for an execution against any other account with access into the IMU.

Figure 12:
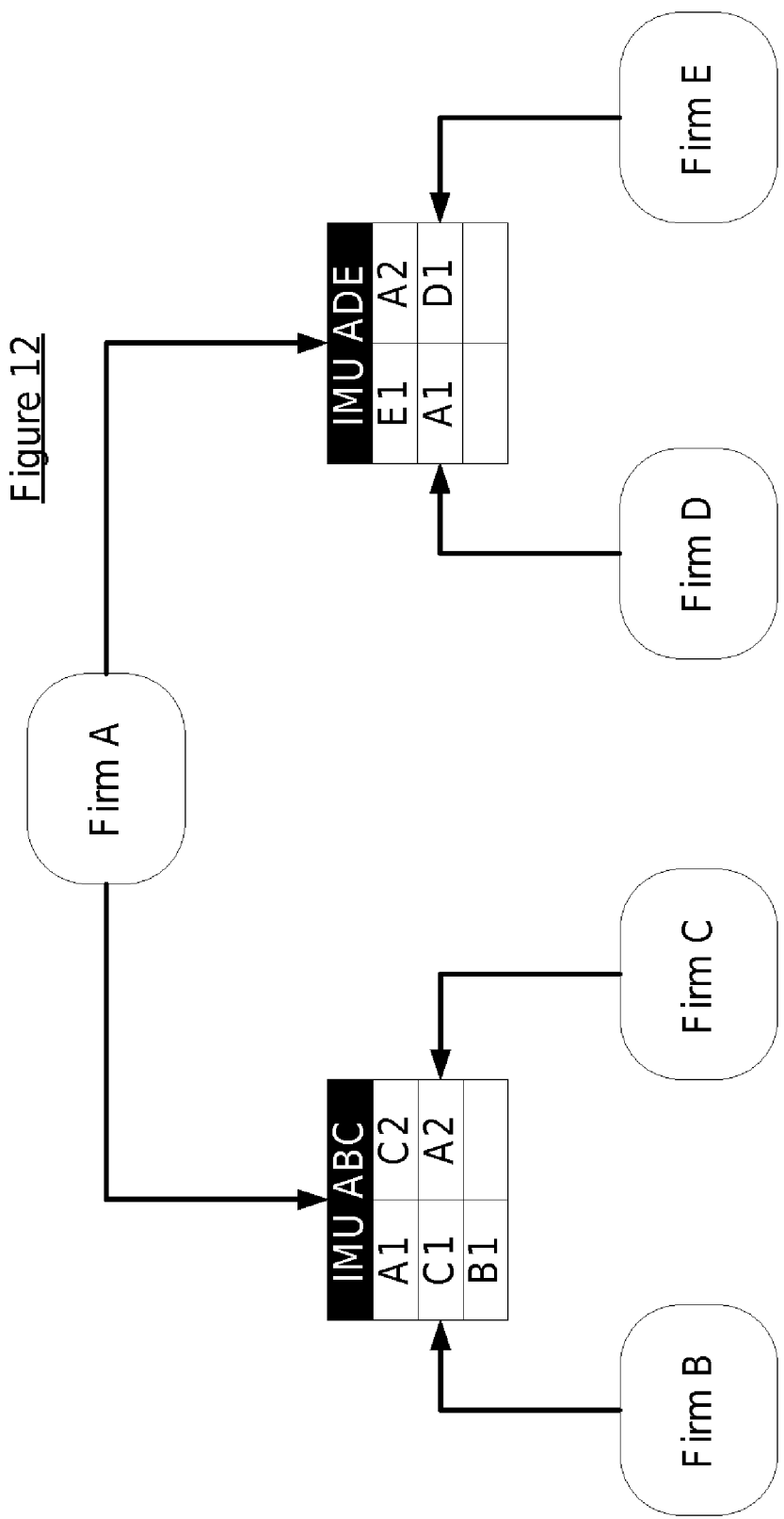
FIG. 12 shows an example of the IMU setup for a controlling account with two IMUs creating two separate entities for permissioned counter-parties.

In addition, according to embodiments of the present invention, account holders are able to setup their accounts so that they can simultaneously participate in multiple IMUs, providing a completely flexible control matrix of approved trading counter-parties. An example of this is shown in FIG. 12, in which Firm A controls two separate IMUs: the first controlling participation between Firms B and C (ABC) as in FIG. 11; and the second controlling participation between Firms D and E (ADE). In the example shown, each defined IMU is an isolated entity (a separate pool of liquidity) where the account holder defines access independently. Hence, any order entered by an account holder will be accessible in all IMUs in which the account holder participates. For example, while Firm A can execute against Firms B and C, or D and E, it is not possible for Firm D to execute against Firm B.

Figure 13:
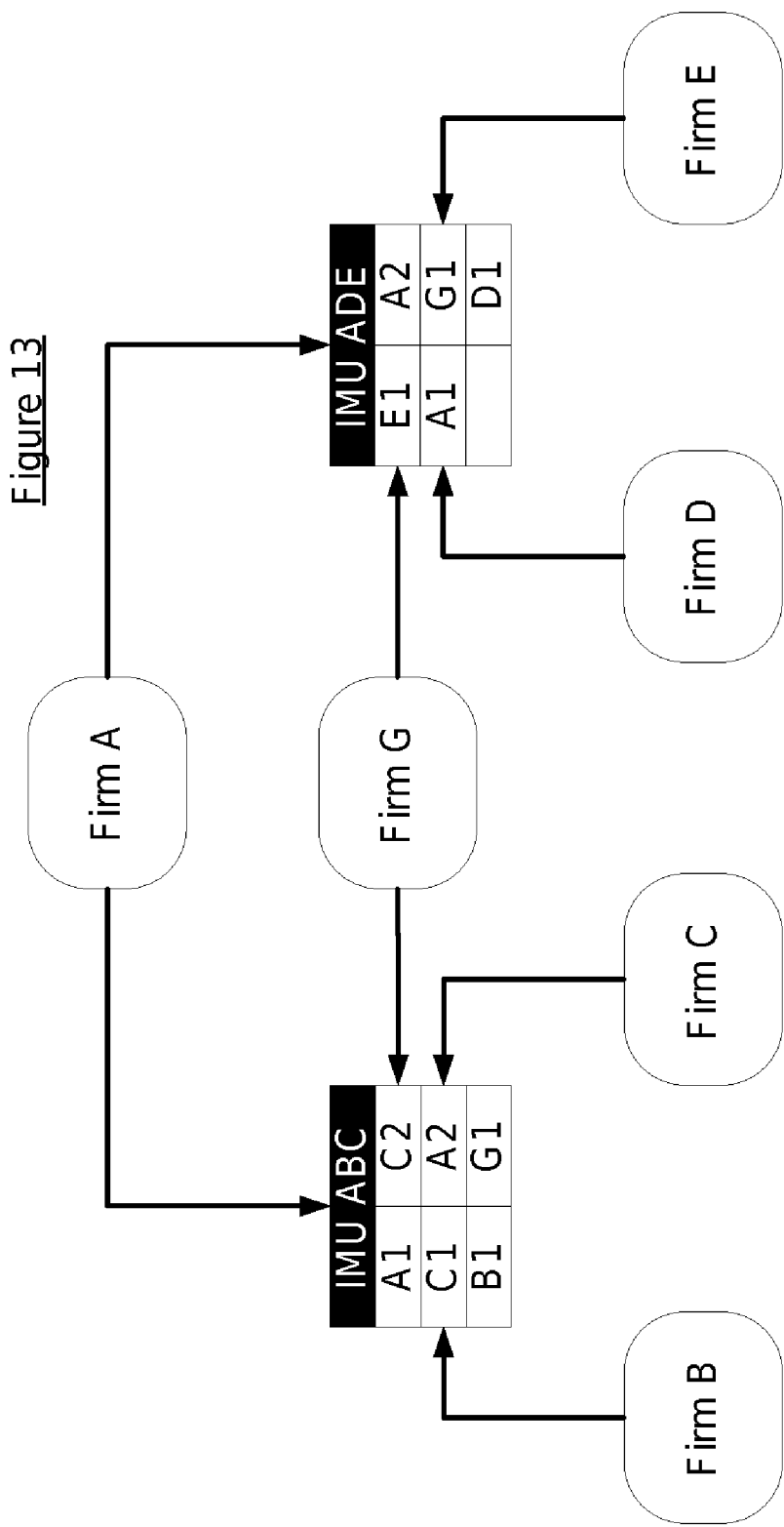
FIG. 13 shows an example of the IMU setup for a controlling account with two IMUs creating two separate entities with permission for one counter-party to access both IMUs.

Extending the example shown in FIG. 11, for instance, it is also possible for Firm A to introduce another degree of participation from a partner firm. In FIG. 13, this type of relationship is shown with the introduction of partner Firm G. According to this example, Firm A configures its IMU such that Firm G is given access to participate in both IMUs (ABCG and ADEG). In this regard, Firm G can execute against the same Firms as Firm A, however, may be given restricted access permissions in terms of configuring the IMU itself, e.g. adding/removing eligible counterparties, defining configurable attributes and such like.

Figure 14:
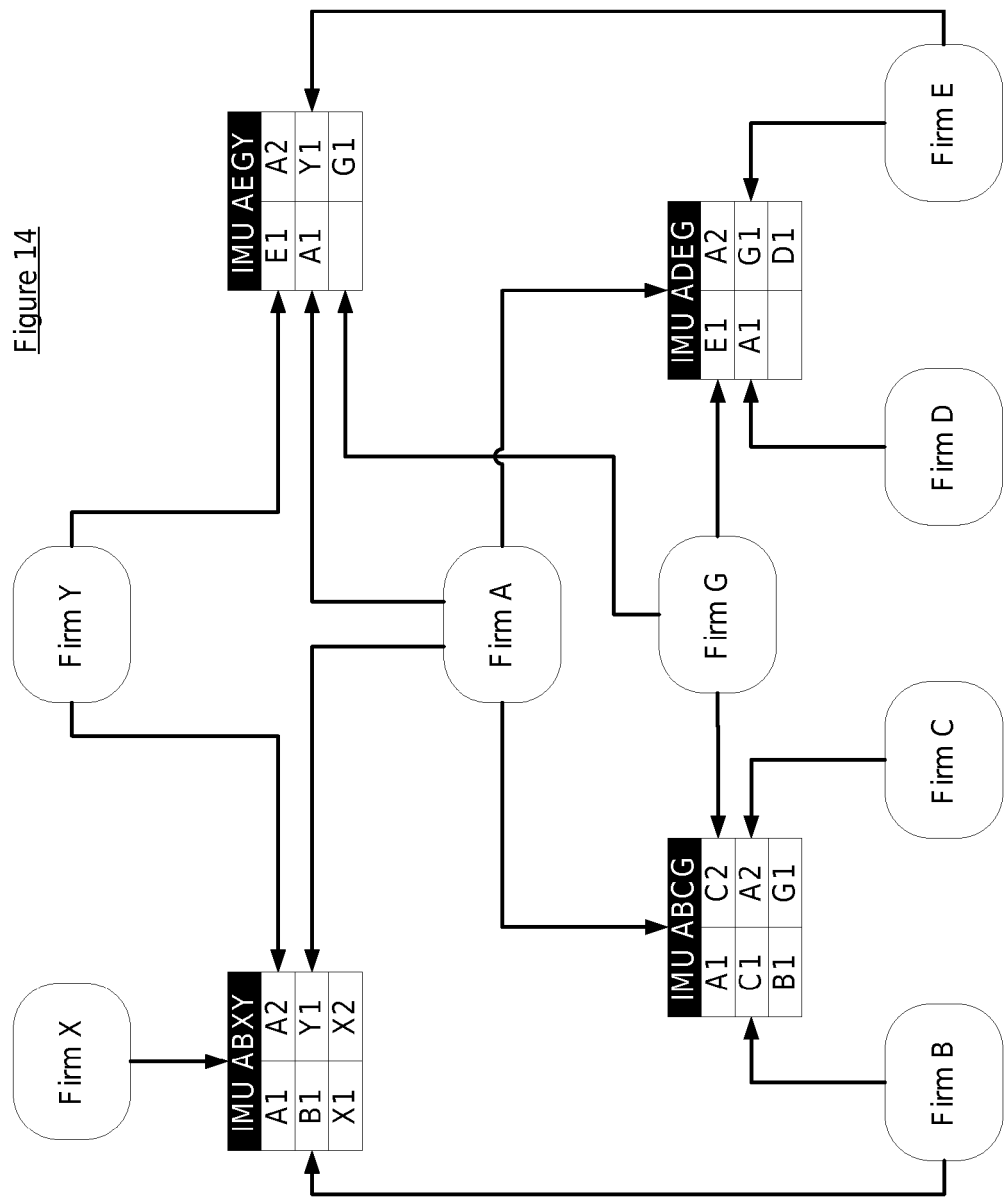
FIG. 14 shows an example of a more complex IMU setup for a controlling account with multiple IMUs.

As will be evident to the skilled person, the configurability of the IMUs, according to embodiments of the present invention, therefore enable complex IMU matrices to be defined by multiple parties, where any party may be an account holder having control of one or more IMUs and may also be a member of an IMU to which they have no control but are able to participate in internalised transaction orders. An example of such a complex matrix is shown in FIG. 14.

In addition to the account holder being able to define and control IMU participation, the account holder is also able to define and manage various preference attributes associated with each defined IMU. These preferences are utilized to determine a preferred execution path when multiple, otherwise identical, opportunities exist. For example, it may be the case that for a given account holder, several IMUs may be available that satisfy the order criteria. In this case, the account holder may specify one or more criteria which prioritize the route of execution. These criteria are stored in the account holder's operation files 140. Prioritizing in this regard may be dependent on any number of factors including but not limited to: cost of execution, bias toward a certain counter-party in the form of assigning account level priority, or any other factors required.

According to embodiments of the invention, the account holder also has the ability to define and manage various cost and preference attributes associated with executing a trade with a specific counter-party. Again, these attributes are stored in the operation files 140 and are also utilized to determine preferred execution path when multiple, otherwise identical, opportunities exist.

Furthermore, the embodiments of the invention also enable the account holder to define and manage various cost and preference attributes associated with executing a trade at a specific external market. These attributes, stored in the operation files 140, are utilised in calculations to determine the best execution alternative when otherwise identical opportunities exist within multiple external markets. In practice, determination of eligible opportunities is based on the original order price, specified in the order message, with the best execution calculation used to determine the optimum execution route. When orders are sent to the external market, they are configured to reflect the original (or improved) order price specification (rather than a calculated synthetic price) to maximize likelihood of execution based on the external market's published liquidity.

According to embodiments of the invention, each configurable attribute that can be maintained or calculated by the matching processor 106, or the central server 102 as a whole, is available to be assigned a level of importance by the account holder. These are termed "criterion importance levels". Importance may be defined according to various levels, for example, "Normal" (1), "Important" (2), and "Preferred" (3). Additional levels of importance may be introduced as needed for instance to increase the degree of granularity in identifying importance.

Throughout any transaction/trading session, the central server 102 according to embodiments of the present invention maintains various real-time statistics regarding communication performance and transactional success for a specific account holder interacting with an external market centre. Through the embodiments of the present invention, the account holder is empowered the ability to assign a level of importance to each of these factors, providing control over how the central server 102, and more specifically, matching processor 106, determines the most overall cost effective opportunity available to the account holder. These values can be maintained and modified by the account holder at any time to be reflective in all future transaction/trading sessions. This data is held in one or more operation files 140 associated with each account holder.

The Criterion Importance Levels are represented within the Account Setup information (see for instance FIG. 2A) available to the matching processor 106 and its sub processes. The criterion may be selected from one or more of the following, non-limited examples:

Price—This represents the resulting best execution price calculation performed by the matching processor 106. This calculation is performed when appropriate and may be unique for each possible external venue. According to one example, the best execution cost engine instructs the routing processor 1004 (see FIG. 9) to select the venue that is offering prices that are equal to or better than alternate reporting venues based on current published market data [Note that price, according to preferred embodiments of the invention, is only an initial determining criteria—if multiple potential counter-parties are identified at the same price level, the best execution engine determines the most cost-effective alternative from these candidates];

FillRate—This represents the percentage of success an account holder has had when submitting order requests to a specific external venue throughout a trading session.

TimeRate—This represents the time latency average the matching processor 106 has experienced throughout the trading session when interacting with a specific external venue.

Destination—This represents the preference values that an account holder may assign to an external venue. These values are reflected in the Account Destination Setup matrix (see FIG. 2C).

Further examples of the available criterion consists of the following, however, other options may be used in addition or as an alternative:

Direct fixed costs—The best execution cost engine calculates a final "synthetic price" for best execution which factors in the participant's configurable fixed costs encountered by the specific participant when routing to a particular venue, and then instructs the routing processor 1004 to find the closest match between the client specified price and the synthetic price;

Likelihood of execution—The best execution cost engine analyses the current depth of the markets available at a particular venue to estimate the likelihood of the execution if the order is directed to that venue for execution (monitored and recalculated throughout the trading session based on the performance of the Venue);

Potential for price improvement—The best execution cost engine determines if there is a better chance of price improvement at any specific venue as compared to others (monitored and recalculated throughout the trading session based on the performance of the Venue); and/or Transaction Costs. The routing processor 1004 is instructed based on total estimated costs for an Account for a particular Venue or Account calculated by the Cost engine based on the Account cost preferences.

These are provided only as examples and the skilled person will be aware that other criterion may be used where desirable or necessary.

In any event, for each element of criteria, a numeric value is assigned to each eligible contra venue based on its sort order when compared against the other eligible contra venues, e.g. the higher the number, the more beneficial that element of criteria is to the account holder. Each of these assigned priority values are applied against the sort order values determined for each element of criteria. The result of multiplying the assigned Criterion Importance Level against the numeric sort order values assigned to an eligible venue for each criteria produces a series of numbers. The total of these numbers produces a numeric indicator of which eligible contra is most advantageous to the Account holder based on their preferences. This calculation is performed by matching processor 106.

Each potential contra account (i.e. the account of an eligible counter-party) that may be encountered when performing an IMU transaction is eligible to be assigned a preference priority. According to the embodiments of the invention, the account holder is empowered the ability to assign any positive numeric value as a priority to transactions performed with the designated contra. This value can be maintained and modified by the Account holder at any time to be reflective in all future trading sessions. This data is stored in one or more operation files 140 associated with the account holder.

When multiple IMU contra orders are identified at the same price, priority of the eligible contra orders is sorted based on this preference order. According to one example, if a specific value is not assigned to a contra account within the account Cost Matrix Setup with a Cost Type equal to 2 (Account Cost Type), that contra account is assigned a default preference priority of 1 (Normal). Please refer to the to the Exemplary Embodiments for more detail.

According to one aspect, account priority assignments only occur when transactions are executed between two accounts within an IMU. According to one aspect, the cost calculation matrix is used for interactions between an account and an external venue.

The embodiments of the present invention are further advantageous over previously known technology in that account holders have simultaneous exposure to all possible external markets that the account is authorized to access, without publishing the order to the external market. Thus, the system 100 provides a consolidated view of the current market liquidity, and can optimize the timing of delivery of the order (or any portion of it) to the specific external venue to the point of highest likelihood that the order will be filled. In this regard, it can be ensured that the maximum amount of eligible quantity is available at the point in time that the opportunity for trade presents itself, without having to retract unfilled orders residing on external market books to replenish available quantity.

Hence, the embodiments of the invention provide many advantages not taught in the prior art. Many of these advantages are a consequence of enabling the account holder full control over orders, and in particular the configuration of their own IMUs, shifting the control solely away from the exchanges. If a Firm wishes to participate in a certain IMU, for instance, the Firm generally has to get permission from the account holder controlling that IMU (e.g. become a customer of the client, or become affiliated in some other way). Other advantages include the facilitation of transactions between eligible counterparties that would not be connectable on existing systems, as well as more effective message routing leading to fewer and more direct transactions.

In preferred embodiments, it is also possible for account holder-specific configurations to be implemented in, for example one or more of: the best execution criteria; cost priorities; and venue preferences.

FIG. 2C shows more detail of the account destination setup table 206, which specifies which venue is used for a particular order type (Order Type) denoted by a number or other indicator. According to one embodiment, the Order Type may be selected from two possibilities: Equity Order (1) and Block Order (2) but according to other embodiments, the order type may be another type depending on the fungible instruments being traded, e.g. Option Orders. The venue ID (Venue) is associated with the venue setup table (see FIG. 3). The handler field contains a list of Handler IDs, which are internal identifiers indicating which sub-process is responsible for handling the routing of the order to a particular Venue on behalf of the Account holder. To this effect, the handler field is used to direct the order to the appropriate central server 102 element.

FIG. 2D shows more detail of the account cost matrix setup table 208, and enables cost calculation preferences to be defined and associated according to user account and/or venues. The account cost matrix 208 is primarily used by the Best Execution Cost Engine 120, as described in more detail below.

The cost calculation matrix is used primarily when determining costs associated for a transaction between the Account holder and an external Venue, and is configurable by an authorized Account holder and/or System Administrator. Account priority assignments are only applicable when transactions occur between two accounts within an IMU. In this regard, costs are associated when performing a transaction between two accounts when performing an IMU transaction, or an account and venue when performing a best execution (BX) routing to an external venue. These types of calculations are typically not applicable when performing an MTF transaction.

The Cost Type values identify the types of cost applicable in any given instance. In the example shown FIG. 2D, there are two possible cost types: (1) Venue, i.e. charges applicable based on venue; and (2) Account, i.e. charges applicable based on account attributes. The charges may be fixed costs, tier costing and/or any other arbitrary costing applicable to the account holder and/or venue.

The Contra column is used to specify which contra the account can execute against and what account or venue cost values are associated with the execution.

V1-V10 are placeholders for various pieces of information necessary to perform the specific calculation based on the Venue/Account it is applied to. According to one example, V1 is used to hold priority parameters.

In the example data tables shown in FIG. 2D, preferences for Accounts ACCTA1-ACCTA4 are demonstrated. For example: Account ACCTA1 has venue cost preferences assigned for Venue "L" which are utilized when performing executions against orders identified from Venue "L", and an account priority preference for IMU executions against counter-party ACCTA2.

According to one embodiment, the account cost matrix setup table further comprises default order values for an account, and holds the various global preference attributes and priority values associated to each of a number of possible options that are configurable by the account holder and/or system administrators. The configuration options are typically priority factors and/or other factors which are taken into consideration during transactions, including but not limited to: speed/likelihood of execution; minimum/maximum price; exchange/broker price differences; etc. Each category of options is pre-defined by the system administrators and may be subsequently configured by the system administrators and/or account holder according to preference.

Client subscription information for use by the disseminator 118 may be maintained in a separate configuration file. The subscription information specifies, for example, what market and transaction data a given client is entitled to receive.

FIG. 3 shows an example of a typical Venue Setup file. The Venue setup file is a table containing a list of external venues, including exchanges, ECNs and other ATSs, along with their venue ID. Significantly, the Venue Setup File is used by the best execution cost engine 120 and BX Router 302 when routing external orders. Connectivity to a specific venue for a client may be made through a number of routes. For example, it may be made back through the client's own infrastructure (if a connection to the Venue already exists), through a sponsored broker of which the system of the present invention has a connection, or by any other means as required.

FIG. 4 shows and example of an "Instrument Master File" according to embodiments of the present invention. Essentially, the Instrument Master File contains listings and attributes of all fungible instruments that can be traded by the server. In other words, it is a translation table for translating financial instrument symbols for use within the server 102. For convenient use within computer systems and display systems, financial instruments are typically represented by short symbols, e.g. a three or four letter code. According to embodiments of the present invention, symbols may be imported from an external source and stored in an archive residing in datastore or in memory. When account holders enter orders using the instrument symbols, the elements of the server 102 are able to reference the archive stored in the Instrument master File to identify which instrument the account holder is referring to.

The symbols may also be used for publishing transaction data through the disseminator 118. Examples of such instrument symbols are well known in the art and include, Reuters Instrument Code (RIC) as used by Reuters to identify financial instruments and indices, Stock Exchange Daily Official List (SEDOL) identifiers as used in the United Kingdom and Ireland, International Securities Identifying Number (ISIN) combined with a currency designation, and such like. As shown in FIG. 4, the instrument Master File includes the name of the instrument (INSTNAME), the base currency (BASECURR) associated with the instrument, internally defined short code for the instrument name (OMI) and an instrument ID for internal use (INSTID).

FIG. 5 shows an example of the Currency Exchange Rate Setup File, which lists possible currency identifiers and daily exchange rates, respectively. These files are used when calculating fees when executing transactions with several specific Venues as fees are based in the local currency of the Venue in question.

The server 102 may also utilise a "Configuration Master File" (not shown) used for system management, and to configure the technical settings for the elements (modules and sub-processes) of the server 102. When each of various elements of the server 102 is initiated, the configuration master file is consulted to determine operational parameters and to set policies that affect how elements run. The file may additionally comprise definitions for both incoming and outgoing FIX connections.

Referring again to FIG. 1, the transaction computer system 100, and more specifically central server 102, further comprises a suite of role based administrative tools 130. The administrative tools 130 exist as a software layer running over the transaction server 102, which allows account holders and system administrators to manage various aspects of the system. The administrative tools 130 are configured to support a range of internet-based technologies including, for example, hyper text mark-up language (HTML), JavaScript, extensible mark-up language (XML), and other protocols. One function of the administrative tools 130 is to enable generation of a GUI for population of the operations files by account holders and/or system administrators. Typically, the pre-defined options are listed in one or more drop-down menus and can be selected and configured accordingly by the account holders, or can be configured by inputting data through some other type of dynamic input form or field.

As an alternative to the administrative tools 130, the operation files may be configured from a client terminal 103 running software specifically implemented to allow the assignment of the configuration data. Again, this may be done through selecting items appearing in drop-down menus or through some other form(s) or field(s) as required.

The administrative tools 130 further provide authorised account holder access to a suite of different reports. Typically each account holder is assigned certain access permissions on registration that are used to determine permissions to access various system functionality, including reports. As stated above, account holders are empowered with the ability to control one or more operation files through the administrative tools 130. In addition, account holders can be entitled to access order status, pre/post execution market data, and best execution details, as well as on demand reporting of historical data in order to perform their own computational analysis. The administrative tools also provide real-time access to account and transaction information, ability to export information to multiple file formats (PDF, CSV, etc.) and ability to view execution reports to validate routing decisions.

The integrator 114 is operable to distribute each of the above-described operation files 140 to memory 121 and/or to other pre-defined destinations within the server 102. Most typically this is done via File Transfer Protocol (FTP) on system startup, however, other protocols may be used where appropriate. According to one embodiment, operation files are all generated prior to the start of the system for a trading session. According to one embodiment, all the operation files 140 are preloaded into memory 121 before the client places an order. However, according to another embodiment, at least some may be loaded upon receipt of an order.

The book manager 110 is operable to write and delete book entries and is logically linked to the in-memory book datastore 112 accordingly. Once a client becomes a member of the system of the present invention and is assigned an account ID, the client's book of business is typically uploaded to and stored in in-memory book datastore 112, along with a field containing the relevant account ID. This means that the book manager is able to link the book of business belonging to each account holder with any operation file 140 also associated with the account ID (e.g. the Account setup File). This enables, for example, the book manager 110 to call up into memory a pre-defined IMU by pooling the relevant books of business of each of the client IDs listed in the IMU Setup File and/or Account Setup list.

As is evident from the description of the various operation files above, in the context of embodiments of the present invention the book manager 110 may simultaneously manage any number of "books", each book representing a single fungible instrument and acting as a different holding repository for offers and bids of clients who route orders internally through server 102. The book manager 110 is configured to write entries to or delete entries from all client books, whether private, public or otherwise (in other words record any transactions).

The internalized matching utility (IMU) processor 108 is a plug-in (or sub-process) of the matching processor 106, configured to carry out fully internalised transactions based on client orders and/or client preferences. The IMU processor 108 is driven, at least in part, by data stored in one or more operations files 140.

Figure 15:
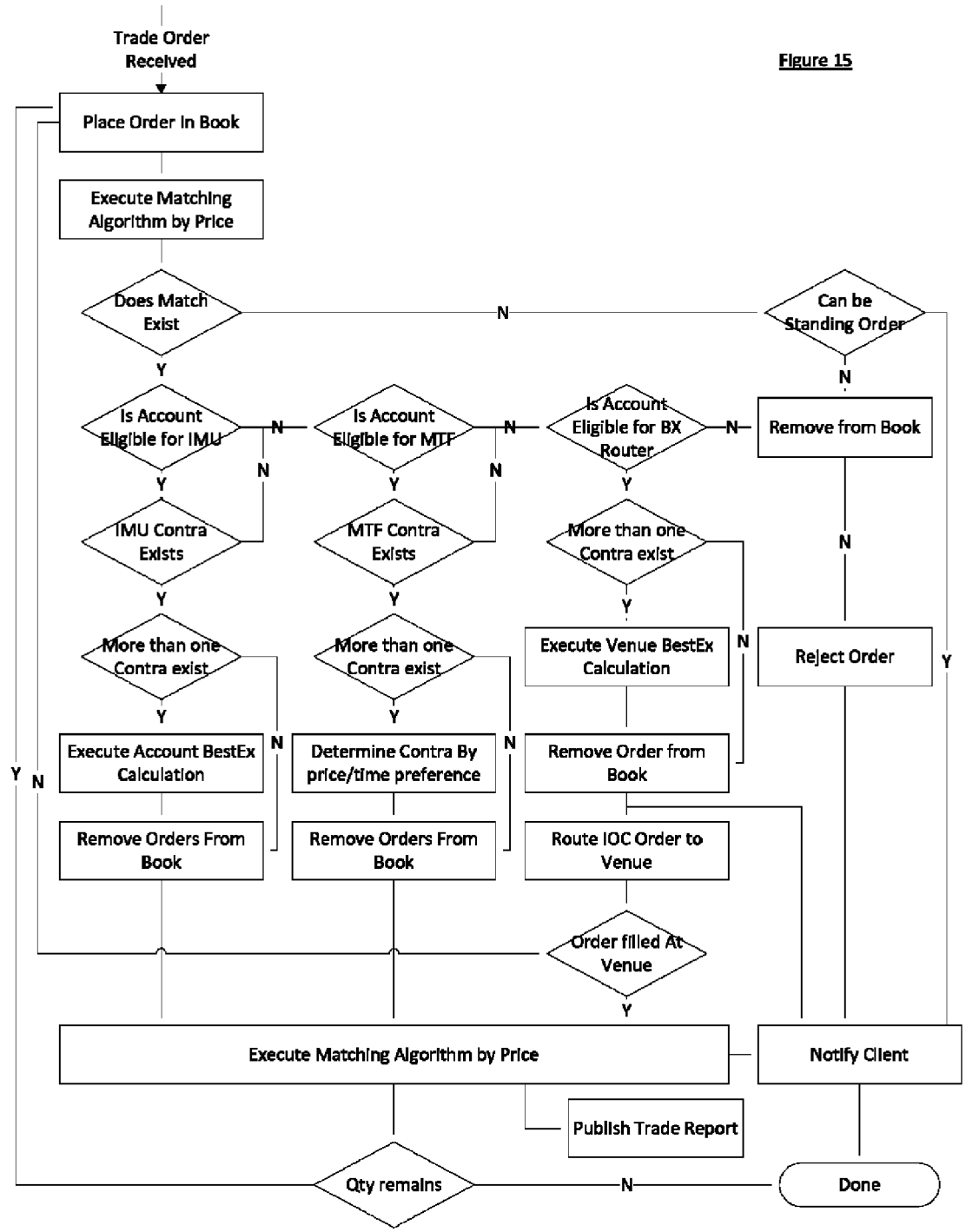
FIG. 15 shows a typical process carried out by the central server according to embodiments of the present invention when a trade order is received.

FIG. 15 shows a typical process carried out by the central server 102 according to embodiments of the present invention when a trade order is received. At s1601 the trade order is received by the DOMM 123. At s1602, the order is placed in the book (i.e. placed in in-memory datastore 112). Following placement into the book, an algorithm based on matching by price is executed s1603. It is then determined if a match exists based on price s1604. The matching processor 106 (and more specifically its relevant sub processor) then ascertains if the account attached to the order is eligible for the IMU s1606, i.e. whether the account holder is party to one or more IMUs. If yes, the matching processor 106 checks whether an IMU contra (i.e. eligible counter-party) exists in a defined IMU s1607. If the order is eligible for the IMU, and an IMU contra exists, the central server 102 then ascertains whether more than one suitable contra exists s1608. If yes, the matching processor 106 executes best execution calculation based on account preferences s1609 stored in one or more operation files 140, removes orders from the book s1610 and executes the trade s1611. If no more than one suitable contra exists, s1609 is skipped and the matching processor 106 instructs the book manager to remove orders straight from the book s1610 and executes the trade s1611. Once the trade has been executed, the matching processor 106 checks whether any quantity of orders remain s1612. If yes, steps s1602-1611 may be repeated. If no, the order is complete.

If it is determined that the account holder is not party to one or more IMUs, or if no standing IMU orders exist that provide an eligible contra order, the matching processor 106 ascertains whether the account attached to the order is eligible for MTF execution s1613 and the order itself is eligible for MTF execution. If yes, by analogy to the equivalent step performed for the IMU execution, the matching processor 106 ascertains whether a suitable MTF contra exists s1614, then whether more than one contra exists s1615. If more than one suitable MTF contra exists, the preferred is determined by price/time preference s1616 based on information stored in the operation files 140, the order is removed from the book s1617 and the trade is executed s1611. If no more than one suitable MTF contra exists, the order is removed straight from the book s1617, skipping s1616 and the trade is executed s1611. If no suitable MTF contra exists, the matching processor 106 checks whether the account/order is eligible for a BX Router calculation S1618.

In the event that an account/order is not eligible for IMU or MTF, or if no standing IMU or MTF orders exist that provide an eligible contra order, the matching processor 106 ascertains whether the account/order is eligible for BX router execution s1618. If yes, the matching processor 106 ascertains whether eligible external contra orders exist. If more than one contra exists s1619, the matching processor uses the preferences contained in the operation files to ascertain the best execution venue from the eligible contra orders. If no more than one suitable contra exists, the order is removed from the book s1621, skipping s1620. Once the order is removed from the book, the order is routed to the venue s1622 and the client may be notified s1624 that the order has been routed. If the order is filled at the venue s1623, steps s1611 and s1612 are repeated and the order is complete. If the order is not filled, or only partially filled at the venue at s1623, the process goes back to s1602. There is also an optional step of publishing the trade report at s1625, wherever necessary.

In the event that the account is not eligible for IMU, MTF or BX Router execution, the order is usually removed from the book s1626, the order is rejected s1627 and the client is notified accordingly s1624.

In the event that no match is found to exist at s1604, matching processor 106 determines whether the order can be placed as a standing order s1628. If yes, the client may be notified s1624. If no, the order is removed from the book s1626, rejected s1627 and the client is notified.

FIG. 16 shows a typical process carried out when the system receives a market price s1701. According to one embodiment, this process follows directly on from that described in accordance with FIG. 15. The external order that is represented by the published price is placed in the book (which resides in in-memory book data store 112) s1702 and the matching algorithm is executed s1703 to match by price. The matching processor 106 then ascertains whether a match exists s1704. If yes, the matching processor 106 ascertains whether more than one contra exists s1705. If no, the venue best execution calculation is executed s1706 and the standing order is removed from the book s1707. If no more than one suitable contra exists, the order is removed from the book s1707, skipping step s1706. Once the order is removed from the book, the order is routed to the venue s1710 as an immediate or cancel (IOC) order and the client may be notified that the order has been routed on s1709. If the order is filled at the venue s1711, the order is executed s1712 and the system checks whether any order quantity remains s1713. The client may be notified s1715 accordingly. If no further quantity remains, the order is complete. If a further quantity remains, the standing order may be placed in the order book s1714, where the trade order process may be carried out (see FIG. 6). If the order is not filled at the venue at s1711, the standing order may be placed in the book as per s1714. There is also an optional step of publishing the trade report at s1716, wherever necessary.

Figure 6:
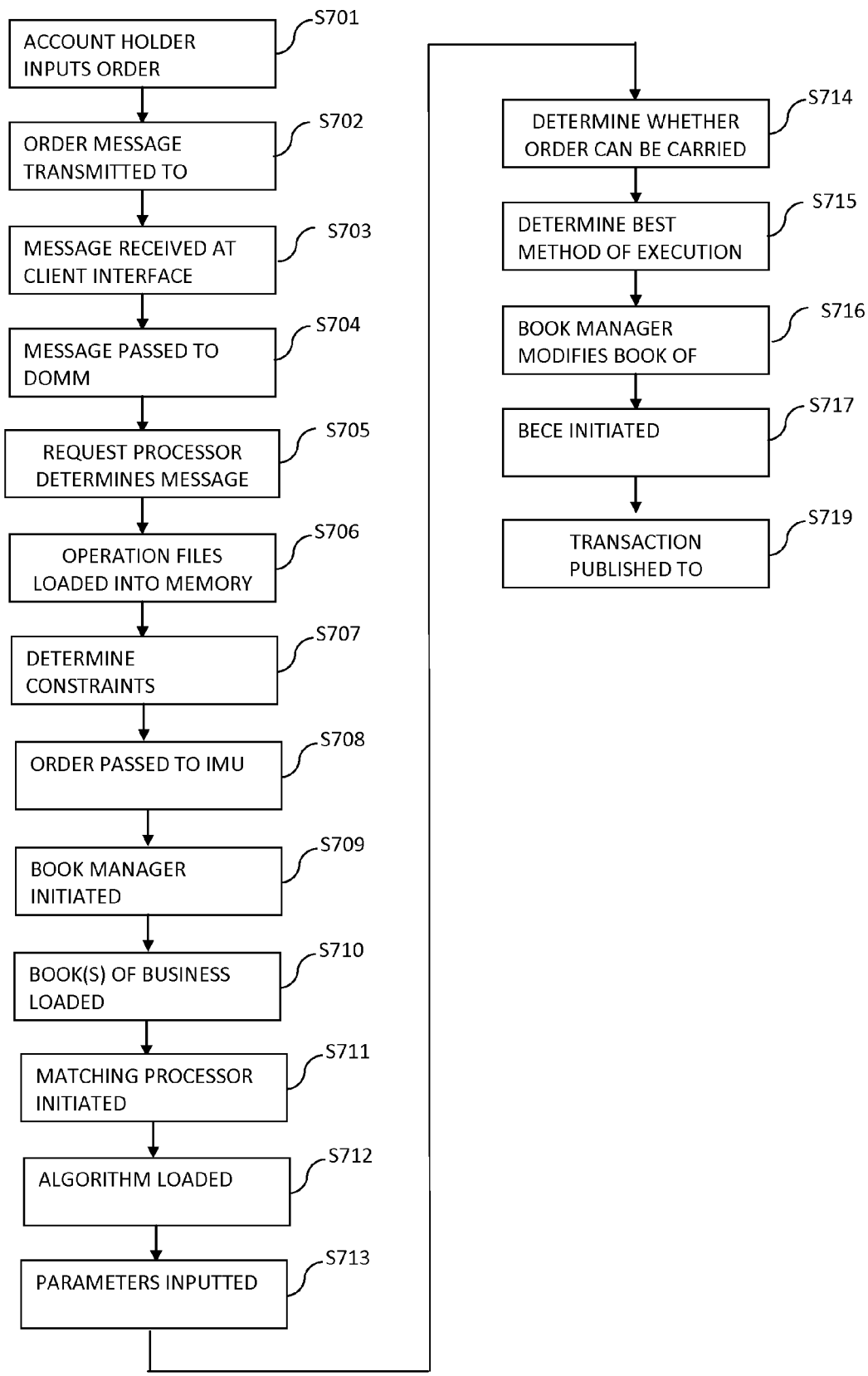
FIG. 6 shows a typical process carried out by the IMU processor according to embodiments of the present invention.

FIG. 6 shows a typical process carried out by the IMU processor 108. The process begins with an account holder (i.e. client) inputting an order S701, for example, through suitable software running on client terminal 103. The order could be delivered through a variety of mechanisms e.g. FIX, external API, Web application, etc. The order may be a buy or sell order, and is transmitted S702 to the server 102 in the form of an order message, typically in FIX protocol, and containing an account identifier giving an indication of client identity, for example, the AccountID (see 202), or a least information from which an account identifier can be determined.

After transmission via a suitable communication link such as the internet, the order message is received S703 at the client interface 104 and is passed S704 from the client interface 104 to the dynamic order management system (DOMM) 123. The request processor 124 of the dynamic order management system 123 then determines S705 the relevant account ID based on the account identifier and the transaction attributes contained within the client order message. The request processor 124 also calls up S706 the relevant operation files 140 and instructs the integrator 114 to load them into memory 121. In certain embodiments, some or all of these operation files are preloaded into the memory, negating the necessity for them to be loaded when a client initiates an order. In other embodiments, the integrator manages loading of relevant operation files into memory on demand. In still further embodiments a combined control approach ensures that certain operation files are preloaded and others are loaded on demand.

The relevant operation files loaded into memory 121, whether before or after receipt of a transaction order from an account holder, include: Instrument Master; Venue Setup; IMU Setup; Currency Exchange Rate; and the Account Matrix, including: Account Setup; Account Destination Setup; Account Cost Matrix. The loading of the operation files into memory 121 in this way is advantageous in that it enables large amounts of transactions to be carried out in real-time, without having to rely upon database access.

From the operation files 140, the request processor determines S707 any configuration information relevant to the order. For example, a client may not specify an order type with each order message, and may instead opt to have a default order type which is used for every order placed by the client unless otherwise stated. In this case, the request processor 124 is able to determine the default order type from the operation files and route the order to the appropriate plug-in/sub-process accordingly. In the process illustrated in FIG. 6, the order type is eligible for use with the IMUs, in other words it is eligible to be carried out as an internalised order through private books, and the request processor passes S708 the order to the IMU processor 108 accordingly.

Once the IMU processor 108 has received the order, it initiates the book manager 110. In turn, the book manager 110 searches and loads S710 the relevant books of business stored in the in-memory book datastore 112. This process is done by the book manager using the relevant account ID identified from the order message and/or using the instrument identifier to locate the appropriate book in order to fetch the associated IMU Setup File and the Account Matrix. From these operation files the book manager 110 is able to identify from the in-memory book datastore 112 the book of business which defines the IMU and load them into memory 121.

Once the private book has been determined, the matching processor 106 is then initiated S711 by the IMU, and the matching processor loads S712 a relevant matching algorithm from the algorithm library 107. The decision as to which algorithm is called up from the algorithm library by the matching processor may be based at least in part on data contained within the order message and/or data contained within operation files. Once the relevant algorithm has been determined, the matching processor then inputs S713 the necessary parameters into the algorithm based on the order message and/or data contained in the operation files 140. Using the algorithm, the matching processor determines: firstly, whether the order can be carried out using IMUs S714 based on whether access to suitable counter-parties to the order exist; and secondly, determines the best method S715 of executing the order between eligible counter-parties.

In order to determine if a suitable counter-party to the order exists, the matching processor 106 determines if any of the suitable counter-parties are participants in the same IMU as the initiating Account holder based on for example data contained in Account Cost Matrix and Account Setup table.

If only one suitable counter-party exists, the matching processor generates an instruction to execute, record, and report the transaction within memory 121. It should be noted that according to preferred embodiments of the present invention, all matching logic resides and executes in memory 121 without any requirement of database access. Any records which need to be updated, for instance, the books of business, may be done after the transaction has occurred using data contained in the memory 121.

On the other hand, if more than one suitable counter-party exists, the matching processor will apply priority routing on the eligible counter-parties using the attributes as defined in for instance the Account Setup and Account Cost Matrix, which are loaded into memory 121, to determine the most client preferred (based on account priority assignments) execution selection between the price equal alternatives. The cost matrix calculations are described in more detail with reference to the best execution cost engine 120.

If the order cannot be processed for any reason, for example if an eligible counter-party is not identified within any of the IMUs that the order's account holder is defined access, the matching processor determines the next course of action based on the attributes of the order and account from the relevant operation files.

If the order that cannot be processed is constrained to be an IMU standing order only, the order is typically placed into the memory 121 as an IMU standing order and is available for consideration on subsequent qualifying orders received. In this regard, the book operates a queue for pending transactions (standing orders), which remains in memory 121 at all times. Thus, when transactions cannot be instantaneously satisfied, they may be queued for a predetermined amount of time so that when it is possible for the transaction to be executed, the DOMM is able to re-process the order using IMUs.

If an order is an "Immediate Or Cancel Order" (IOC), i.e. an order requiring that all or part of the order be executed immediately after it has been brought to the market, or a "Fill or Kill" (FOK), i.e. an order to fill a transaction immediately and completely or not at all, then a cancel command is issued by the DOMM and the order is cancelled. According to one embodiment, upon failure to offset an IOC/FOK order using IMUs, a rejection message may be sent by the DOMM 123 back to the client through client interface 104.

On the other hand, if the order that cannot be processed is eligible for additional processing, such as an MTF and/or BX Router calculation, the order is presented to the respective sub-process for processing. Broadly, if the account holder and order are both flagged eligible for the MTF then a check is made for that level of counter-party. If the account holder and order are both flagged eligible for the Best Execution Router then a cost matrix calculation is applied to all possible counter-parties. Each of these scenarios is described in more detail below.

According to the example illustrated in FIG. 6, the order is eligible for completion through the defined IMUs. Therefore, a command is sent by the matching processor 106 to the book manager 110, which modifies S716 the book of business in memory in order to reflect the transaction.

As stated above, if more than one suitable contra, or counter-party, exists for an IMU order, the matching processor will apply priority sorting. To this effect, the DOMM 123 initiates S717 the Best Execution Cost Engine (BECE) 120 upon receipt of a command indicating that more than one suitable counter-party exists for an IMU order. The BECE 120 is operable to carry out cost matrix calculations based on data pre-loaded into memory 121 and/or data contained in operation files 140 not loaded into memory. Broadly, the Best Execution Cost Engine provides an authorized Account holder (i.e. one with a valid Account ID), or alternatively a System Administrator, the ability to assign various priorities with performing an electronic exchange of financial instruments with another account holder. These priority values are fully configurable and stored in account cost matrix. Since the Best Execution Cost Engine 120 operates based on data stored in account cost matrix, it is a dynamically configurable engine which can be fully customised according to account holder or system administrator preferences.

The settlement manager 126 is operable to collect or distribute charges to the initiating account holder or satisfying party, as appropriate. In the case of a fully internalised transaction carried out through IMUs, there is typically not a physical exchange of a settlement cost between the buyer or seller. However, a buyer and/or seller is generally charged a transaction fee based on, for example, the number of instruments bought or sold through the IMUs, or otherwise. Transaction fees may be fixed, or calculated based on any criteria as desired.

Where the order is not totally "dark", the disseminator 118 publishes S719 the transaction with appropriate transaction details. Dark orders are characterized in that they do not publish pre-trade but are still reported post-trade (in the case of MTF). IMU transactions may or may not be immediately published but instead may be published at a later time within regulatory requirements. The Guidelines governing transaction publications can be found, for example, at the website of the Financial Services Authority.

The IMU processor 108 according to the embodiments of the present invention is advantageous over the transaction systems of the prior art in that it provides a regulatory compliant solution for firms to internalise order flow while at the same time reducing the administrative burden upon them. In addition, for certain types of transactions, the IMU processor can significantly reduce and/or completely eliminate transaction and/or settlement costs. Thus, the IMU processor 108 enables market participants (account holders) with substantial order flow to utilise internal liquidity and unlock potential order flow. Overall, this enables account holding firms to convert their order for books of business into fungible assets capable of interacting with both internal business units and their peers in a cost effective and beneficial manner.

Figure 7:
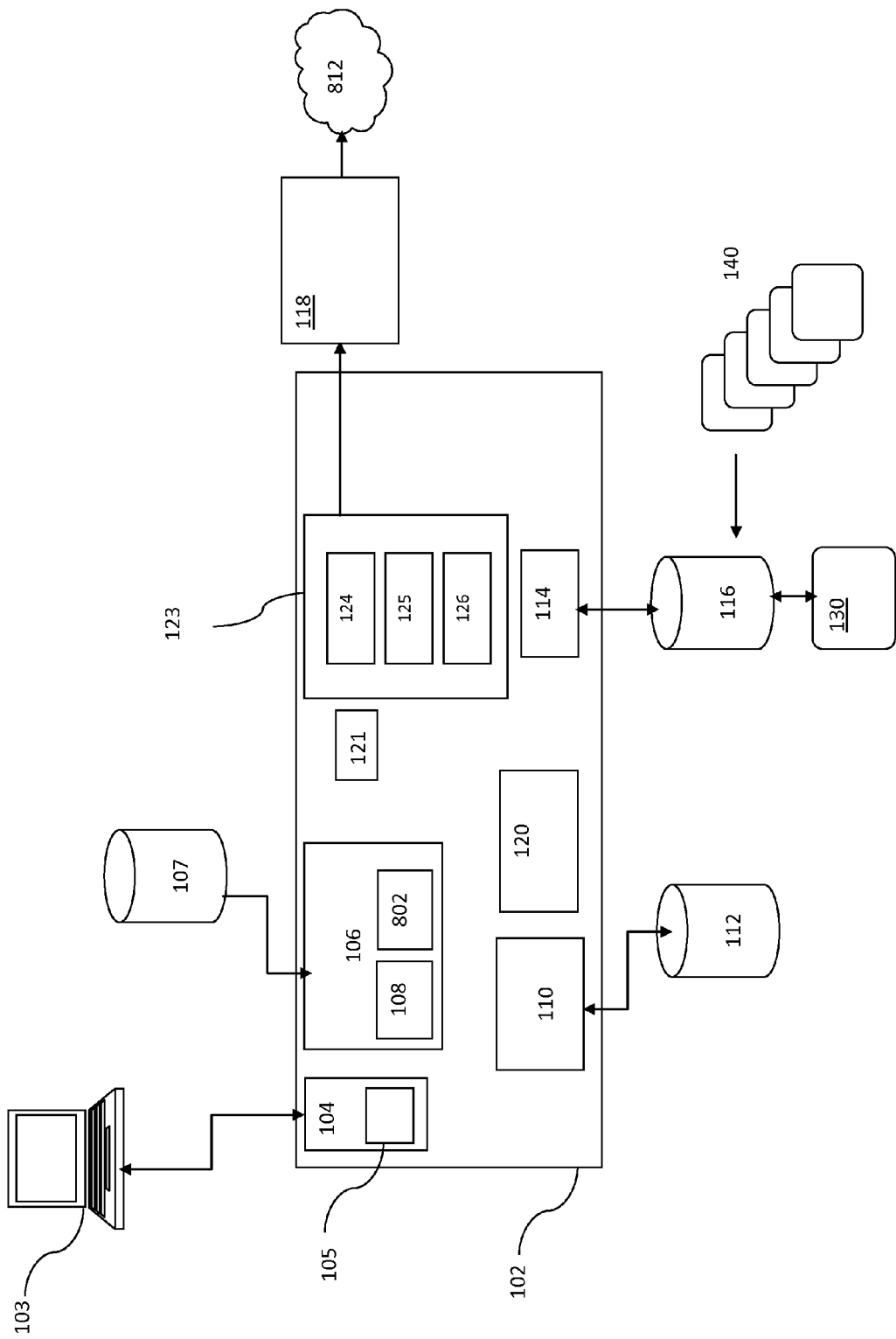
FIG. 7 shows another embodiment of the transaction computer system of the present invention, with the inclusion of among other processors, an MTF processor.

FIG. 7 shows another embodiment of the transaction computer system of the present invention 800. The embodiment shown in FIG. 7 is similar to that shown in FIG. 1, with like reference numerals representing technically equivalent features, unless otherwise stated. The main difference between the transaction computer system shown in FIG. 1 and that shown in FIG. 7 is the addition of a MTF processor 802. As with the IMU processor 108, the MTF processor 802 is a sub-process of the matching processor 106, configured to carry out transactions based on client orders and/or client preferences. The MTF processor 802 is driven, at least in part, by data contained in the operation files 140.

The MTF processor 802 facilitates uniting of buy and sell orders from multiple parties. By analogy to the "private books" defined in relation the IMUs above, MTF transactions are governed according to multilateral trading books. These books represent a portfolio of financial instruments held by clients, whether those instruments are equities, exchange traded funds, warranties, option on equities etc. Essentially, multilateral trading books represent the books of business of account holders of the transaction system that are made publicly available to other account holders. Therefore, the multilateral trading books usually constitute a much larger pool than the private books, and hence may provide an account holder with more transaction options. However, the use of multilateral trading books may not afford a client all the same advantages as the private books but still brings together multiple client buying and selling interests in financial instruments in accordance with the provisions of MiFID. For convenience, multilateral trading books will be referred to herein as "public books".

Figure 8:
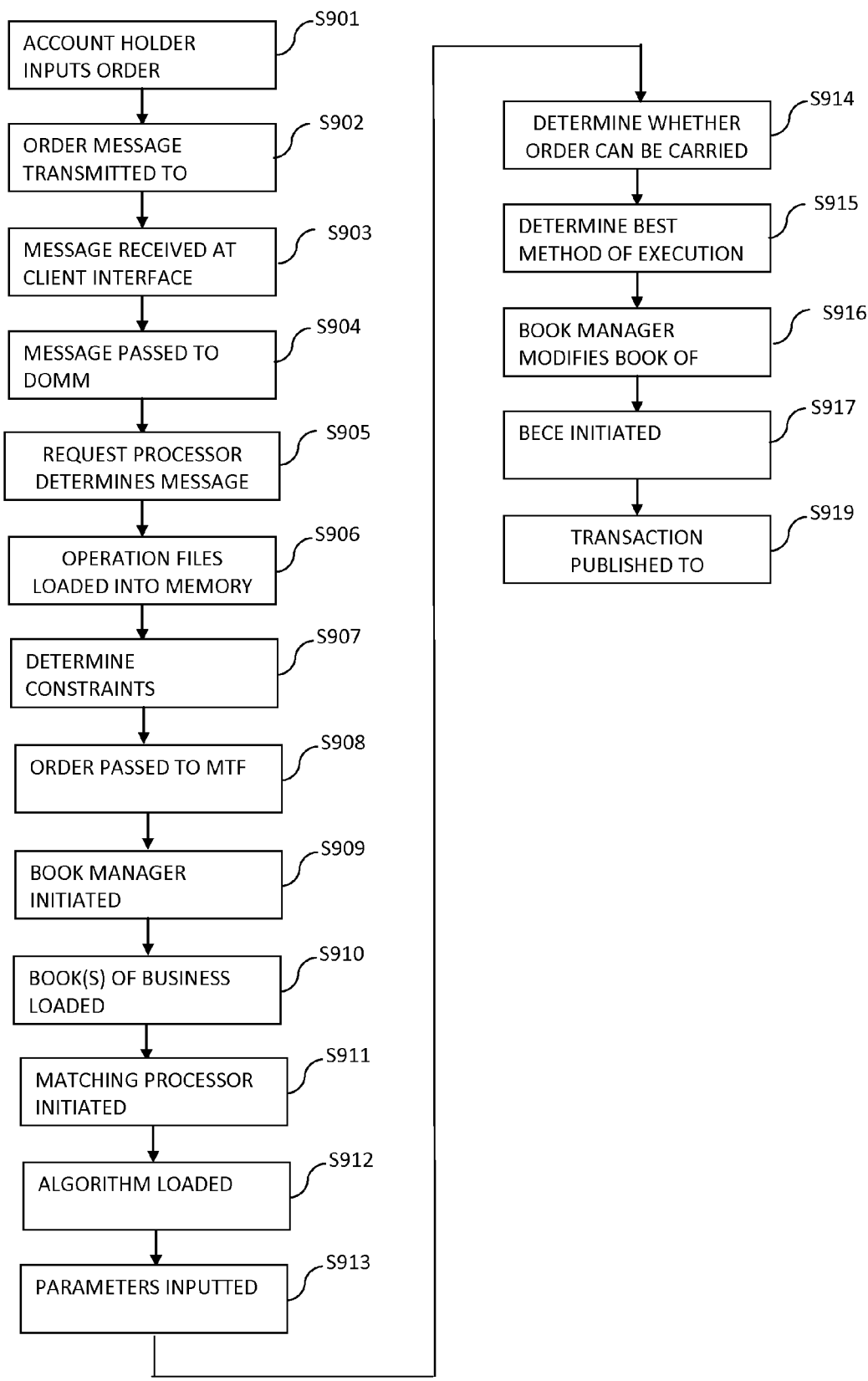
FIG. 8 shows a typical process carried out by the MTF processor according to an embodiment of the present invention.

FIG. 8 shows a typical process carried out by the MTF processor. The steps S901-S907 and S909-S919 are equivalent to those of S701-S707 and S709-S719 of the process shown in FIG. 6, and therefore will not be described again. The difference in this case is the MTF processor does not use private books to satisfy transactions, instead using publicly available books of business ("public books"). As shown at S908, the order is passed by the DOMM to the MTF processor. In operation, the MTF processor is analogous to the IMU processor and carries out similar process steps in order to match orders. However, rather than using the IMUs to try and find the best match for a transaction, the MTF processor will utilise all standing orders residing in the MTF contained within the book datastore 112 in order to try and find the best match for a transaction based on price-time priority.

As will be evident, the MTF process may be initiated only after failure to satisfy an order through the IMU, i.e. when there are no suitable predefined IMU groups capable of resolving the order. However, it may equally be the case that the MTF is the client's default choice for routing the transaction and a given transaction may not involve the IMU at all.

FIG. 9 shows another embodiment of the present invention 1000. Again, reference numerals which are the same as in FIGS. 1 and 7 are to be interpreted as representing technically equivalent features. The main difference between the embodiment shown in FIG. 9 and those shown in FIGS. 1 and 7 is that the embodiment shown in FIG. 9 further comprises a Best eXecution (BX) Router processor 1002. In addition to the BX router, the following additional features are also shown: a market data feed 1014, a system monitor 1008, an external venue interface 1010. The external venue interface 1010 handles the communication infrastructure when an order is to be routed to an external venue for execution.

According to one embodiment, each of the additional features 1014 and 1010 are optional components and may be implemented in any of the disclosed embodiments of the present invention as required.

As with the IMU processor 108 and the MTF processor 802, the BX Router 1002 is a sub-process of the matching processor 106, configured to route transactions to external venues based on account holder orders and/or predefined preferences. The BX Router 1002 is driven, at least in part, by data contained in the operation files 140, and is concerned with "proactive" orders, i.e. finding the best possible match for a transaction at external venues.

The BX Router 1002 comprises a routing processor 1004, and a market data feed 1006 for receiving market data 1007, and enabling the storing of historical market data, for use in best execution matching. The market data feed 1006 may receive market feed data directly or alternatively receive it via a separate system 1014 situated at a remote site. The system 1014 is operable to receive market data from an external data feed, for instance, one or more remote venues providing real-time or near real-time data. The feed interface generally receives direct market feeds at very low latency and may support ASCII and FAST-compacted market data feeds or other formats, enabling the server 102 to receive direct market data from exchanges, MTFs and SIs. The requisite data used by the best execution cost engine is obtained through the market data feed 1006.

The routing processor 1004 is linked to the algorithm library 107 and the Best Execution Cost Engine 120. The routing processor is an algorithmic-based processor, architected to address best execution requirements for account holder orders. The algorithm library 107 contains algorithms generated based on predefined best execution scenarios. These algorithms are loaded into memory 121 upon request by routing processor 1004 and are fully configurable by the account holders and/or system administrators, and relate to best execution scenarios based on price, liquidity, latency, likelihood, or cost (commissions and fees), or other metrics defined in the operation files 140.

The external venue interface 1010 allows the server 102 to connect to external venues such as MTFs, exchanges etc. in order to gather the requisite data so that the routing processor and best execution cost engine can determine the best execution for a given transaction.

External venues are listed in the Venue Setup, which enables the routing processor 1004 to connect to them via interface 1010. The external venue interface 1010 also allows the DOMM 123 to send transaction requests to and receive transaction confirmation from external venues. Accordingly, the external venue interface 1010 comprises a translator 105 which functions to translate order messages to and from FIX protocol or otherwise.

Figure 10:
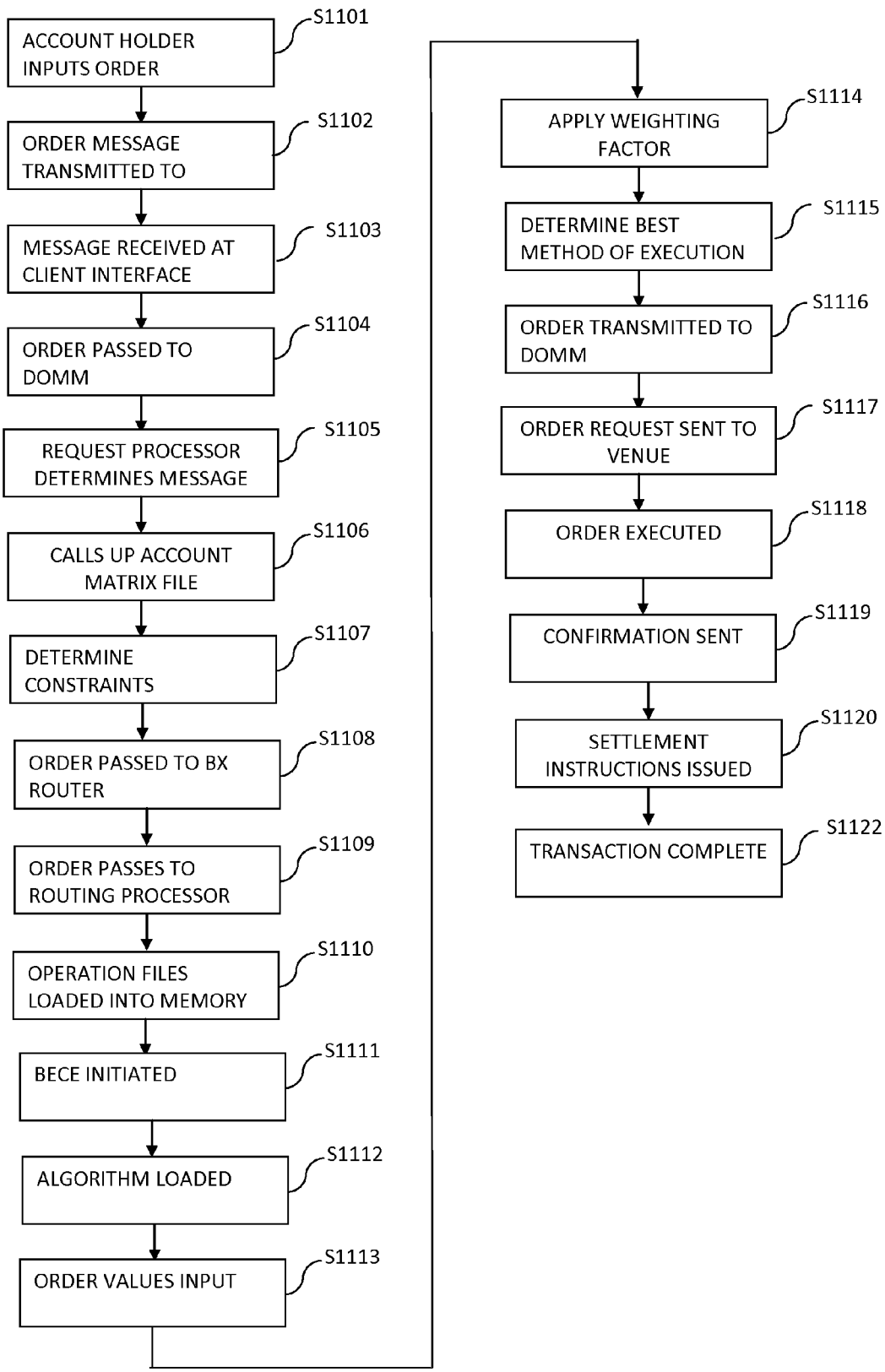
FIG. 10 shows a process carried out by the BX Router according to an embodiment of the present invention.

FIG. 10 shows a process carried out by the BX Router according to embodiments of the present invention. Steps of S1101-S1107 are equivalent to those described with reference to steps S701-S707 of FIG. 6 and therefore will not be described again. When an order is determined to be proactive by the request processor, it is passed S1108 to the BX router and received s1109 by the routing processor 1004. The routing processor 1004 uses the Account ID contained in the order message to locate and load S1110, via the integrator 114, the relevant account operation files 140 which have not already loaded into memory 121 upon initialisation of the system. This enables the routing processor to communicate with external venues or relevant data feeds and receive data for use in best execution calculation. The routing processor then initiates s1111 the best execution cost engine 120.

The best execution cost engine then loads up S1112 one or more relevant algorithms from the library and inputs order values S1113 accordingly. It may additionally configure the one or more algorithms, for example by applying priority factors S1114, based on the operation files 140. The Best Execution Cost Engine then performs calculation using data loaded into memory for the eligible counter-parties to determine S115 the most overall advantageous execution selection based on account preferences.

Generally, the best execution cost engine is initiated to perform the best execution calculation whenever more than one suitable counter-party exists. As stated above, however, cost calculations are typically performed for proactive orders, whereas IMU orders only utilize account preferencing, not cost calculations. The cost calculation is used to determine actual costs associated for a transaction between parties, for example, an Account holder and an external Venue. An authorized Account Holder or System Administrator is provided a mechanism to easily assign the necessary values required by each distinctive Venue. These numeric values represent either a fixed cost or a percentage value to be injected into the appropriate locations within that Venue's cost calculation. The best execution cost engine therefore utilizes a computation that is unique for each possible Venue and uses data from the configurable operation files 140, e.g. those shown in FIGS. 2C-2E.

When performing the best execution calculation with algorithms from algorithm library 107, the best execution cost engine will take into consideration all relevant factors, for example, fixed costs, currency rate exchange values, priority factors, market conditions, order conditions, account information and any other relevant factors in order to determine the most cost efficient execution.

According to embodiments of the present invention, each of the non-fixed cost attributes are optional with the Account holder having the ability to include or exclude any one or all of these from being considered when calculating actual cost.

As stated above, Account holders can also assign a priority factor to each of the various cost elements through the operation files 140 to allow for one or more elements of criteria to hold more impact than the others when determining an estimated total cost.

With price, speed of execution, likelihood of execution and price improvement, parameter criteria are dynamically generated throughout the active trading session, based on both real-time and historical information, and may be influenced by current market trends received via interface 1006. Although the above examples represent exemplary criteria in determining best execution matches for transaction, they are not intended to be limiting and other factors may be taken into consideration. In addition, where more than one algorithm is used, certain priority factors may be assigned by account holder or authorized administrator giving more weight to certain algorithms based on client preference.

If it is determined by the BECE 120 that an alternative execution is more cost efficient based on the results of the calculation, it will instruct the routing processor 1004 to determine the next course of action based on the attributes of the order and account information. Where a best execution has not been determined the order may be cancelled, or queued for subsequent best execution calculation.

Once the best venue and method of execution has been determined, the order is then transmitted S1116 to the DOMM, and through the DOMM 123 to a suitable trading venue S1117 based on account holder configured relationships and network parameters in the form of an order request message (typically in FIX protocol) via external venue interface 1010.

The order request message may include the price conditions the initiating account holder is prepared to accept when the fulfilling party executes the transaction. Examples of price conditions according to certain embodiments: "sell limit price"—i.e. the lowest price that the initiating client is prepared to accept in exchange for its securities; "buy limit price"—i.e. the highest price that the initiating account holder is prepared to pay in exchange for obtaining the securities. Other price conditions may also be used.

After receiving the order and agreeing to fulfil the order, the party situated at the external venue (fulfilling party) executes the order S1118 in their market and sends a confirmation S1119 message back to server 102 which is received at external venue interface and routed back to the initiating account holder through client interface 104. When the order has been executed, a message detailing the transaction is sent by the DOMM 123 to the settlement manager 126, which completes the process by issuing settlement instructions S1120. Account holders are usually also charged on a "per-transaction" basis for each transaction which passes through the server 102 and the settlement manager 126 will process this charge by communicating it to the account holder. The transaction is then complete S1122. Alternatively, a fee from the system may take into account which of the (sub-) processors were engaged to lead to the transaction, e.g. one or more of IMU processor, MTF processor, BX router processor. This way, a charge may be made which reflects the extent to which the transaction benefits from the aspects of the system.

The settlement instructions ensure that both parties deliver/receive the securities, and that monies are paid by the members to/from each other securely. Settlement instructions may include for example: identity of the fulfilling client; details of the execution venue; instructions indicating how the order should be traded; identity of the initiating client who routed the order; trade date; settlement date; payment currency; account details and so on.

As will be clear, the party situated at the external venue (the fulfilling party) has discretion as whether to accept or reject an order received from the server 102 on behalf of an initiating client. When a fulfilling party rejects an order, the initiating account holder may be sent an order reject message, which may or may not include an indication of the reason for the rejection. If no match for a transaction is found, in other words if the order is rejected by the fulfilling party or if there are simply no ways of carrying out the order at the present time at external venues, then the transaction may be queued for future processing by the IMU Processor, MTF Processor or BX Router based on account and order preferences.

EXEMPLARY EMBODIMENTS

The following exemplary embodiments are intended to illustrate the function of the central server 102 during several order scenarios according to embodiments of the present invention. They are provided for the purposes of illustration and are not intended to be limiting on the scope of the invention in any way. Additional reference should be made to FIGS. 2-5 particularly.

For the examples provided, a standing book within in-memory book datastore 112 is used as a basis point as an additional order is entered into the system. These standing orders are reflected within the book in in-memory book datastore 112 based on the order's "price+entrytime" sorting order.

For simplicity, the entered timestamp is not displayed within the examples but it can be assumed to be shown in order based on this timestamp.

The "FLAGS" attribute (see Annex to the Exemplary Embodiments), shown on all orders, both incoming and those standing within the book in in-memory book data store 112, consists of 3 separate indicators combined into a single field. The value associated is based on position within the flag. A '1' in a position indicates on, a '0' indicates off.

Position 1—order eligible for IMU

Position 2—order eligible for MTF

Position 3—order eligible for BX Router

According to one embodiment, default values for these are also maintained at the account level. Hence, if the account holder elects not to provide these values within the order request itself, these values may be derived based on the default Account Setup preferences (see Annex to the Exemplary Embodiments), i.e. in operation files 140.

If multiple contra orders are identified which satisfy the matching criteria for an incoming order, the following rules can be used to determine matching priority:

Orders are first sorted by limit price, e.g.:

For sells, higher order prices are matched first.

For buys, lower order prices are matched first.

If multiple orders exist at the same price, orders are prioritized based on sub-process (IMU, MTF, and BX router):

IMU orders are matched first

1. If multiple orders exist at the same price within an IMU, the account's best execution parameters are used to determine the order in which the IMU orders will be matched. If no clear determination is made utilizing this sort priority, orders are matched on a First In First Out (FIFO) basis.

MTF orders are matched second

2. If multiple orders exist at the same price within the MTF, orders are matched on a FIFO basis.

Exchange orders are matched last

3. If multiple orders exist at the same price at multiple exchanges, the account's best execution parameters are used to determine the order in which the exchange orders will be matched.

Example 1

This example demonstrates basic handling of an incoming Buy order according to an embodiment of the present invention. In this example, account holder ACCTA2 submits an order to BUY 50 shares of AAAA trading in GBP at a Limit price of 25.65. The incoming order is flagged as being eligible for IMU, MTF, and Best Execution calculations.

According to this example, the standing order book at the time the incoming order is entered into the system appears as follows:

| INSTRUMENT: AAAA · BASE CCY: GBP ||||| |||||
|--|--|--|--|--|--|--|--|--|
| BID |||||  ASK |||||
| ORDERID | ORIGIN | QTY | FLAGS | LIMIT | LIMIT | FLAGS | QTY | ORIGIN | ORDERID |
| CLORD01 | ACCTA1 | 100 | 111 | 25.35 | 25.65 | 001 | 200 | L | CLORD11 |
| CLORD02 | L | 50 | 001 | 25.35 | 25.65 | 100 | 150 | ACCTA3 | CLORD12 |
| CLORD03 | ST | 200 | 001 | 25.35 | 25.70 | 110 | 100 | ACCTA4 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 001 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

While potentially containing additional attributes, the incoming order contains the following information:

| ORDERID | ACCTID | INSTRUMENT | CCY | QTY | TYPE | SIDE | LIMIT | FLAGS |
|--|--|--|--|--|--|--|--|--|
| CLORD20 | ACCTA2 | AAAA | GBP | 50 | Limit | Buy | 25.65 | 111 |

Based on the status of the standing book, two potential contra orders are identified based on price eligibility:

| LIMIT | FLAGS | QTY | ORIGIN | ORDERID |
|--|--|--|--|--|
| 25.65 | 001 | 200 | L | CLORD11 |
| 25.65 | 100 | 150 | ACCTA3 | CLORD12 |

Since the incoming order is flagged as being IMU eligible, the potential contras are filtered based on any that are also IMU eligible, specifically those IMUs that ACCTA2 is authorized to participate in (IMUA1):

| LIMIT | FLAGS | QTY | ORIGIN | ORDERID |
|-------|-------|-----|--------|---------|
| 25.65 | 100   | 150 | ACCTA3 | CLORD12 |

It is determined that ACCTA3 is also authorized to participate in IMUA1. Since only one potential contra exists at this point, no Account-based best execution cost calculation is performed.

The incoming order is FILLED against ACCTA3's standing order CLORD12 for a quantity of 50, as indicated by the incoming order, at the price 25.65.

| | BID | | | | ASK | | | |
|---|---|---|---|---|---|---|---|---|
| ORDERID | ORIGIN | VOLUME | FLAGS | LIMIT | LIMIT | FLAGS | VOLUME | ORIGIN | ORDERID |
| CLORD20 | ACCTA2 | 50 | 111 | 25.65 | 25.65 | 100 | 50 | ACCTA3 | CLORD12 |

Order CLORD12's quantity within the standing book is reduced by 50 shares to show a total available quantity of 100 shares. Its position within the standing book, based on entered time, is not modified by this adjustment. Following these transactions, the standing book appears as follows:

| INSTRUMENT: AAAA · BASE CCY: GBP | | | | | | | | | |
|---|---|---|---|---|---|---|---|---|---|
| | BID | | | | | ASK | | | |
| ORDERID | ORIGIN | QTY | FLAGS | LIMIT | LIMIT | FLAGS | QTY | ORIGIN | ORDERID |
| CLORD01 | ACCTA1 | 100 | 111 | 25.35 | 25.65 | 001 | 200 | L | CLORD11 |
| CLORD02 | L | 50 | 001 | 25.35 | 25.65 | 100 | 100 | ACCTA3 | CLORD12 |
| CLORD03 | ST | 200 | 001 | 25.35 | 25.70 | 110 | 100 | ACCTA4 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 001 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

Notification of the executions is communicated to the participating clients and authorized feed subscribers.

Example 2

This example demonstrates basic handling of an incoming Sell order which is not fully executed based on the status of the standing book and the flags associated with the incoming Order and/or Account. In this example, ACCTA3 submits order to SELL 150 shares of AAAA trading in GBP at a Limit price of 25.35. The incoming order is flagged as being eligible for IMU Only and not eligible for MTF or Best Execution handling.

The standing order book at the time the incoming order is entered into the system appears as follows:

| INSTRUMENT: AAAA · BASE CCY: GBP | | | | | | | | | |
|---|---|---|---|---|---|---|---|---|---|
| | BID | | | | | ASK | | | |
| ORDERID | ORIGIN | QTY | FLAGS | LIMIT | LIMIT | FLAGS | QTY | ORIGIN | ORDERID |
| CLORD01 | ACCTA1 | 100 | 111 | 25.35 | 25.65 | 001 | 200 | L | CLORD11 |
| CLORD02 | L | 50 | 001 | 25.35 | 25.65 | 100 | 150 | ACCTA3 | CLORD12 |
| CLORD03 | ST | 200 | 001 | 25.35 | 25.70 | 110 | 100 | ACCTA4 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 001 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

While potentially containing additional attributes, the incoming order contains the following information:

| ORDERID | ACCTID | INSTRUMENT | CCY | QTY | TYPE | SIDE | LIMIT | FLAGS |
|---|---|---|---|---|---|---|---|---|
| CLORD21 | ACCTA3 | AAAA | GBP | 150 | Limit | Sell | 25.35 | 100 |

Based on the status of the standing book, three potential contra orders are identified based on price eligibility:

| ORDERID | ORIGIN | QTY | LIMIT | FLAGS |
|---|---|---|---|---|
| CLORD01 | ACCTA1 | 100 | 25.35 | 111 |
| CLORD02 | L | 50 | 25.35 | 001 |
| CLORD03 | ST | 200 | 25.35 | 001 |

Since the incoming order is flagged as being IMU eligible, the potential contras are filtered based on any that are also IMU eligible, specifically those IMUs that ACCTA3 is authorized to participate in (IMUA1):

| ORDERID | ORIGIN | QTY | LIMIT | FLAGS |
|---|---|---|---|---|
| CLORD01 | ACCTA1 | 100 | 25.35 | 111 |

It is determined that ACCTA1 is also authorized to participate in IMUA1. Since only one potential contra exists at this point, no Account-based best execution cost calculation is performed.

The incoming order is PARTIALLY FILLED against ACCTA1's standing order CLORD01 for a quantity of 100 at the price 25.35.

| BID | | | | | ASK | | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD01 | ACCTA1 | 100 | 111 | 25.35 | 25.35 | 100 | 100 | ACCTA3 | CLORD21 |

The standing order CLORD01 is removed from the standing book as completely FILLED.

From the incoming order a quantity of 50 remains to be managed. The remaining standing orders that are price eligible are processed to be valid contra orders.

| ORDERID | ORIGIN | QTY | LIMIT | FLAGS |
|---|---|---|---|---|
| CLORD02 | L | 50 | 25.35 | 001 |
| CLORD03 | ST | 200 | 25.35 | 001 |

Since the only two standing orders remaining are representative of orders existing outside of the system, i.e. London Stock Exchange and Stockholm Stock Exchange in this example, and the incoming order is flagged as being IMU Only, there are no valid contras found and the remaining portion of the incoming order is placed in the standing book to be eligible for future execution. Following processing the standing book appears as follows:

| INSTRUMENT: AAAA • BASE CCY: GBP |||||||||
|---|---|---|---|---|---|---|---|---|
| BID ||||| ASK ||||
| ORDERID | ORIGIN | QTY | LIMIT | FLAGS | ORDERID | LIMIT | QTY | ORIGIN | FLAGS |
| CLORD02 | L | 50 | 25.35 | 001 | CLORD21 | 25.35 | 50 | ACCTA3 | 100 |
| CLORD03 | ST | 200 | 25.35 | 001 | CLORD11 | 25.65 | 200 | L | 001 |
| CLORD04 | ACCTA3 | 250 | 25.30 | 100 | CLORD12 | 25.65 | 150 | ACCTA3 | 100 |
| CLORD05 | ST | 150 | 25.30 | 001 | CLORD13 | 25.70 | 100 | ACCTA4 | 110 |
| CLORD06 | ACCTA4 | 50 | 25.30 | 110 | CLORD14 | 25.72 | 200 | ST | 001 |
| CLORD07 | ACCTA2 | 100 | 25.30 | 111 | CLORD15 | 25.72 | 100 | L | 001 |
| | | | | | CLORD16 | 25.72 | 100 | ACCTA2 | 111 |
| | | | | | CLORD17 | 25.72 | 50 | ACCTA1 | 111 |

Notification of the executions is communicated to the participating clients and authorized feed subscribers.

Example 3

This example demonstrates an advanced processing scenario of an incoming Sell order that results in price improvement as well as best execution calculations at both the Account and Venue levels at various points throughout the handling of the incoming order. In this example, ACCTA1 submits order to Sell 500 shares of AAAA trading in GBP at a Limit price of 25.30. The incoming order is flagged as being eligible for IMU, MTF, and Best Execution calculations.

The standing order book at the time the incoming order is entered into the system appears as follows:

| INSTRUMENT: AAAA • BASE CCY: GBP |||||||||
|---|---|---|---|---|---|---|---|---|
| BID |||| ASK |||||
| ORDERID | ORIGIN | QTY | FLAGS | LIMIT | LIMIT | FLAGS | QTY | ORIGIN | ORDERID |
| CLORD01 | ACCTA2 | 100 | 111 | 25.35 | 25.65 | 001 | 200 | L | CLORD11 |
| CLORD02 | L | 50 | 001 | 25.35 | 25.65 | 100 | 150 | ACCTA3 | CLORD12 |
| CLORD03 | ST | 200 | 001 | 25.35 | 25.70 | 110 | 100 | ACCTA4 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 001 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

While potentially containing additional attributes, the incoming order contains the following information:

| ORDERID | ACCTID | INSTRUMENT | CCY | QTY | TYPE | SIDE | LIMIT | FLAGS |
|---|---|---|---|---|---|---|---|---|
| CLORD31 | ACCTA1 | AAAA | GBP | 500 | Limit | Sell | 25.30 | 111 |

Based on the status of the standing book, seven potential contra orders are identified based on price eligibility:

| ORDERID | ORIGIN | QTY | FLAGS | LIMIT |
|---|---|---|---|---|
| CLORD01 | ACCTA2 | 100 | 111 | 25.35 |
| CLORD02 | L | 50 | 001 | 25.35 |
| CLORD03 | ST | 200 | 001 | 25.35 |
| CLORD04 | ACCTA3 | 250 | 100 | 25.30 |
| CLORD05 | ST | 150 | 001 | 25.30 |
| CLORD06 | ACCTA4 | 50 | 110 | 25.30 |

-continued

| ORDERID | ORIGIN | QTY | FLAGS | LIMIT |
|---|---|---|---|---|
| CLORD07 | ACCTA2 | 100 | 111 | 25.30 |

Since an opportunity for price improvement exists (23.35) over the price submitted on the incoming order (23.30), the standing orders at this improved price point are processed first.

| ORDERID | ORIGIN | QTY | FLAGS | LIMIT |
|---|---|---|---|---|
| CLORD01 | ACCTA2 | 100 | 111 | 25.35 |
| CLORD02 | L | 50 | 001 | 25.35 |
| CLORD03 | ST | 200 | 001 | 25.35 |

Since the incoming order is flagged as being IMU eligible, the potential contras are filtered based on any that are also IMU eligible, specifically those IMUs that ACCTA1 is authorized to participate in (IMUA1 and IMUA2):

| ORDERID | ORIGIN | QTY | FLAGS | LIMIT |
|---------|--------|-----|-------|-------|
| CLORD01 | ACCTA2 | 100 | 111   | 25.35 |

It is determined that ACCTA2 is also authorized to participate in IMUA1. Since only one potential contra exists at this point, no Account-based best execution cost calculation is performed.

The incoming order is PARTIALLY FILLED against ACCTA2's standing order CLORD01 for a quantity of 100, as allowed by the standing order, at the price 25.35. The standing order CLORD01 is removed from the standing book as completely FILLED.

| | BID | | | | | ASK | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD01 | ACCTA2 | 100 | 111 | 25.35 | 25.35 | 111 | 100 | ACCTA1 | CLORD31 |

From the incoming order a quantity of 400 remains to be managed. The remaining standing orders that are price eligible at the improved price are processed to be valid contra orders.

| ORDERID | ORIGIN | QTY | FLAGS | LIMIT |
|---------|--------|-----|-------|-------|
| CLORD02 | L  | 50  | 001 | 25.35 |
| CLORD03 | ST | 200 | 001 | 25.35 |

Since the incoming order is flagged as being Best Execution router eligible, and multiple contras exist at this price point, venue-based best execution cost calculations are performed using a base quantity being the lowest common available quantity between all potential contra orders, as well as available quantity of the incoming order. As reflected in this example, the quantity used within the best execution calculation would be 50 since this is the maximum available quantity of order CLORD02 within the standing book.

ACCTA1 Account Cost Matrix Setup values defined by the Account holder, or entered by an authorized system administrator, consist of the following:

| AccountID | Cost Type | Contra | V1 | V2 | V3 | V4 | V5 | V6 | V7 | V8 | V9 | V10 |
|-----------|-----------|--------|-----|------|------|----|----|----|----|----|----|-----|
| ACCTA1 | 1 | L  | 0.075 | 0.234 | 11.72 | 0 | 0 | 0 | 0 | 0 | 0 | 0 |
| ACCTA1 | 1 | ST | 0.2   | 0     | 0     | 0 | 0 | 0 | 0 | 0 | 0 | 0 |

The external venues referenced by the available standing orders in this example include the London Stock Exchange (CLORD02) and the Stockholm Stock Exchange (CLORD03). The appropriate calculation formulas and ACCTA1'a assigned Account Cost Matrix Setup values are obtained for these eligible venues.

Exemplary London Stock Exchange (LSE) Rate Calculation

Total Trade Fee =

$$(+\text{MinMax}(OrderValueGBP * 0.001 * FeeRate, MinFee, MaxFee))$$

ACCTA1 settings for LSE $FeeRate = 0.075$ $MinFee = 0.234$ $MaxFee = 11.72$ $OrderValueGBP = 50\ (qty) * 25.35\ (px) * 1.0\ (GBP - GPB)$
$= 1267.5$ LSE Calculated Result for 50 shares traded at 25.35 GBP using the above Account Cost Matrix Setup values:

$$= (0.01 + \text{MinMax}(1267.5 * 0.001 * 0.075, 0.234, 11.72)) *$$
$$(GBP - EUR\ Xrate)$$
$$= (0.01 + \text{MinMax}(0.09506, 0.234, 11.72)) * (GBP - EUR\ Xrate)$$
$$= (0.01 + 0.234) * (GBP - EUR\ Xrate)$$
$$= (0.244) * 1.23182\ (GBP - EUR)$$
$$= 0.30050\ EUR$$

Exemplary Stockholm Stock Exchange (SEK) Rate Calculation

Total Trade Fee = 5.30 SEK +

$$(\text{Cap}(OrderValueSEK * 0.000046, 440\ SEK) * DiscountPercent) *$$

-continued

FX Conversion Rate to EUR

ACCTA1 settings for ST $DiscountPercent = 0.2$ $OrderValueSEK = 50\ (qty) * 25.35\ (px) * 11.6565\ (GBP - SEK)$
$= 14744.61375\ SEK$ Stockholm calculated result for 50 shares traded at 25.35 GBP using the above Account Cost Matrix Setup values:

$= (5.30\ SEK) + (Cap(14744.61375 * 0.000046, 440\ SEK) * 0.2)$ $= 5.30\ SEK + (Cap(0.67962, 440\ SEK) * 0.2)$ $= 5.30\ SEK + (0.67962 * 0.2)$ $= 5.30\ SEK + 0.13592$ $= 5.43592\ SEK$ $= 5.31550 * 0.10567\ (SEK \to EUR)$ $= 0.56117\ EUR$

The eligible contra orders are prioritized based on the results of the cost calculation processing giving highest priority to the most cost effective alternative for the Account holder. From the above calculations, the most cost effective venue for performing a transaction, based on the Account holder's cost values, place L as more favourable than ST and the available contra orders are ordered accordingly for processing.

| ORDERID | ORIGIN | QTY | FLAGS | LIMIT | BestExPx |
|---------|--------|-----|-------|-------|----------|
| CLORD02 | L | 50 | 001 | 25.35 | 0.30050 |

-continued

| ORDERID | ORIGIN | QTY | FLAGS | LIMIT | BestExPx |
|---------|--------|-----|-------|-------|----------|
| CLORD03 | ST | 200 | 001 | 25.35 | 0.56117 |

The Account's Criterion Importance Levels are utilized to further optimize the opportunities available to the Account holder. Throughout the trading session, the following statistics are maintained by the system for Account ACCTA1 when interacting with the L and ST external venues. (Note that the Preference criteria is statically obtained from the Account Destination Setup data matrix).

| ACCOUNT | VENUE | FILLRATE | TIMERATE | PREFERENCE |
|---------|-------|----------|----------|------------|
| ACCTA1 | ST | 70% | 0.895 | 2 |
| ACCTA1 | L | 65% | 1.205 | 1 |

Based on the information maintained, calculated costs, and static information maintained by the Account holder, the following are derived:

| ACCOUNT | VENUE | PRICE | FILLRATE | TIMERATE | PREFERENCE |
|---------|-------|-------|----------|----------|------------|
| ACCTA1 | ST | 1 | 2 | 2 | 2 |
| ACCTA1 | L | 2 | 1 | 1 | 1 |

From the Account Setup data matrix for Account ACCTA1, the following Criterion Importance Levels are assigned:

| ACCOUNT | PRICE | FILLRATE | TIMERATE | DESTINATION |
|---------|-------|----------|----------|-------------|
| ACCTA1 | 3 | 2 | 2 | 1 |

Applying these Importance Levels against the calculated and derived values results in the following:

| ACCOUNT | VENUE | PRICE | FILLRATE | TIMERATE | PREFERENCE | TOTAL |
|---------|-------|-------|----------|----------|------------|-------|
| ACCTA1 | ST | 1 * 3 | 2 * 2 | 2 * 2 | 2 * 1 | 3 + 4 + 4 + 2 = 13 |
| ACCTA1 | L | 2 * 3 | 1 * 2 | 1 * 2 | 1 * 1 | 6 + 2 + 2 + 1 = 11 |

* Note that although the best execution price calculation determined that the best price can be obtained with L, additional control empowered to the Account holder determines the best overall execution option exists with ST.

Based on these determinations, the incoming order is PARTIALLY FILLED against ST's

| | BID | | | | | ASK | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD03 | ST | 200 | 001 | 25.35 | 25.35 | 111 | 200 | ACCTA1 | CLORD31 | standing order CLORD03 for a quantity of 200 at the price 25.35. The standing order CLORD03 is removed from the standing book as completely FILLED.

From the incoming order a quantity of 200 remains to be managed. The remaining standing orders that are price eligible are processed. Since only one potential contra order exists, no Best Ex Cost calculation is performed.

| ORDERID | ORIGIN | QTY | FLAGS | LIMIT |
|---------|--------|-----|-------|-------|
| CLORD02 | L | 50 | 001 | 25.35 |

The incoming order is PARTIALLY FILLED against L's standing order CLORD02 for a quantity of 50 at the price 25.35. The standing order CLORD02 is removed from the standing book as completely FILLED.

|         | BID    |     |       |       |       | ASK   |     |        |         |
|---------|--------|-----|-------|-------|-------|-------|-----|--------|---------|
| ORDERID | ORIGIN | QTY | FLAGS | LIMIT | LIMIT | FLAGS | QTY | ORIGIN | ORDERID |
| CLORD02 | L      | 50  | 001   | 25.35 | 25.35 | 111   | 50  | ACCTA1 | CLORD31 |

From the incoming order a quantity of 150 remains to be managed. Since all standing orders at the original price point have been satisfied, the remaining standing orders that are price eligible are processed. Based on previous determination, four potential contra orders remain within the standing book:

| ORDERID | ORIGIN | QTY | FLAGS | LIMIT |
|---------|--------|-----|-------|-------|
| CLORD04 | ACCTA3 | 250 | 100   | 25.30 |
| CLORD05 | ST     | 150 | 001   | 25.30 |
| CLORD06 | ACCTA4 | 50  | 110   | 25.30 |
| CLORD07 | ACCTA2 | 100 | 111   | 25.30 |

Since the incoming order is flagged as being IMU eligible, the potential contras are filtered based on any that are also IMU eligible, specifically those IMUs that ACCTA1 is authorized to participate in (IMUA1 and IMUA2):

| ORDERID | ORIGIN | QTY | FLAGS | LIMIT |
|---------|--------|-----|-------|-------|
| CLORD04 | ACCTA3 | 250 | 100   | 25.30 |
| CLORD06 | ACCTA4 | 50  | 110   | 25.30 |
| CLORD07 | ACCTA2 | 100 | 111   | 25.30 |

From these available IMU eligible contra orders, these are reordered based on the Account Preference Priority assigned by the Account holder or authorized system Administrator. When more than one Account is assigned the same priority then these orders maintain their original time entry priority.

IMU Account Contra Preference Priority Calculation

ACCTA1 contra account preference settings

ACCTA2 priority=1

ACCTA3 priority=1

ACCTA4 priority=2

Applying these results in the following priority order:

| ORDERID | ORIGIN | QTY | FLAGS | LIMIT |
|---------|--------|-----|-------|-------|
| CLORD06 | ACCTA4 | 50  | 110   | 25.30 |
| CLORD04 | ACCTA3 | 250 | 100   | 25.30 |
| CLORD07 | ACCTA2 | 100 | 111   | 25.30 |

The incoming order is PARTIALLY FILLED against ACCTA4's standing order CLORD06 for a quantity of 50 at the price 25.30. The standing order CLORD06 is removed from the standing book as completely FILLED.

|         | BID    |        |       |       |       | ASK   |        |        |         |
|---------|--------|--------|-------|-------|-------|-------|--------|--------|---------|
| ORDERID | ORIGIN | VOLUME | FLAGS | LIMIT | LIMIT | FLAGS | VOLUME | ORIGIN | ORDERID |
| CLORD06 | ACCTA4 | 50     | 110   | 25.30 | 25.30 | 111   | 50     | ACCTA1 | CLORD31 |

From the incoming order a quantity of 100 remains to be managed. The remaining standing orders that are price eligible are processed in their sorted order:

| ORDERID | ORIGIN | QTY | FLAGS | LIMIT |
|---------|--------|-----|-------|-------|
| CLORD04 | ACCTA3 | 250 | 100   | 25.30 |
| CLORD07 | ACCTA2 | 100 | 111   | 25.30 |

The incoming order is PARTIALLY FILLED against ACCTA3's standing order CLORD04 for a quantity of 100 at the price 25.30. Order CLORD04's quantity within the standing book is reduced by 100 shares to show a total available quantity of 150 shares. Its position within the standing book, based on entered time, is not modified by this adjustment.

| | BID | | | | ASK | | | |
|---|---|---|---|---|---|---|---|---|
| ORDERID | ORIGIN | VOLUME | FLAGS | LIMIT | LIMIT | FLAGS | VOLUME | ORIGIN | ORDERID |
| CLORD04 | ACCTA3 | 100 | 110 | 25.30 | 25.30 | 111 | 100 | ACCTA1 | CLORD31 |

Following this transaction, the complete quantity of the incoming order has been completely fulfilled.

The processing of the incoming order CLORD21 resulted in the executions in the following order.

| | BID | | | | ASK | | | |
|---|---|---|---|---|---|---|---|---|
| ORDERID | ORIGIN | VOLUME | FLAGS | LIMIT | LIMIT | FLAGS | VOLUME | ORIGIN | ORDERID |
| CLORD01 | ACCTA2 | 100 | 111 | 25.35 | 25.35 | 111 | 100 | ACCTA1 | CLORD31 |
| CLORD03 | ST | 200 | 001 | 25.35 | 25.35 | 111 | 200 | ACCTA1 | CLORD31 |
| CLORD02 | L | 50 | 001 | 25.35 | 25.35 | 111 | 50 | ACCTA1 | CLORD31 |
| CLORD06 | ACCTA4 | 50 | 110 | 25.30 | 25.30 | 111 | 50 | ACCTA1 | CLORD31 |
| CLORD04 | ACCTA3 | 100 | 100 | 25.30 | 25.30 | 111 | 100 | ACCTA1 | CLORD31 |

Following these executions, the standing book appears as follows:

| INSTRUMENT: AAAA • BASE CCY: GBP | | | | | | | | |
|---|---|---|---|---|---|---|---|---|
| | BID | | | | ASK | | | |
| ORDERID | ORIGIN | QTY | FLAGS | LIMIT | LIMIT | FLAGS | QTY | ORIGIN | ORDERID |
| CLORD04 | ACCTA3 | 150 | 100 | 25.30 | 25.65 | 001 | 200 | L | CLORD11 |
| CLORD05 | ST | 150 | 001 | 25.30 | 25.65 | 100 | 150 | ACCTA3 | CLORD12 |
| CLORD07 | ACCTA2 | 100 | 111 | 25.30 | 25.70 | 110 | 100 | ACCTA4 | CLORD13 |
| | | | | | 25.72 | 001 | 200 | ST | CLORD14 |
| | | | | | 25.72 | 001 | 100 | L | CLORD15 |
| | | | | | 25.72 | 111 | 100 | ACCTA2 | CLORD16 |
| | | | | | 25.72 | 111 | 50 | ACCTA1 | CLORD17 |

Notification of the executions is communicated to the participating clients and authorized feed subscribers.

Example 4

This example demonstrates basic handling of an incoming Buy order. As in Example 1, ACCTA2 submits order to BUY 50 shares of AAAA trading in GBP at a Limit price of 25.65. The incoming order is flagged as being eligible for IMU, MTF, and Best Execution calculations. However, prior to the start of the trading session, the IMU Account owner, or an authorized OpenMatch administrator, modified IMU access rights removing ACCTA2 from being authorized to participate in IMUA1.

The standing order book at the time the incoming order is entered into the system appears as follows:

| INSTRUMENT: AAAA • BASE CCY: GBP | | | | | | | | |
|---|---|---|---|---|---|---|---|---|
| | BID | | | | ASK | | | |
| ORDERID | ORIGIN | QTY | FLAGS | LIMIT | LIMIT | FLAGS | QTY | ORIGIN | ORDERID |
| CLORD01 | ACCTA1 | 100 | 111 | 25.35 | 25.65 | 001 | 200 | L | CLORD11 |
| CLORD02 | L | 50 | 001 | 25.35 | 25.65 | 100 | 150 | ACCTA3 | CLORD12 |
| CLORD03 | ST | 200 | 001 | 25.35 | 25.70 | 110 | 100 | ACCTA4 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 001 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

While potentially containing additional attributes, the incoming order contains the following information:

| ORDERID | ACCTID | INSTRUMENT | CCY | QTY | TYPE | SIDE | LIMIT | FLAGS |
|---|---|---|---|---|---|---|---|---|
| CLORD41 | ACCTA2 | AAAA | GBP | 50 | Limit | Buy | 25.65 | 111 |

Based on the status of the standing book, two potential contra orders are identified based on price eligibility:

| LIMIT | FLAGS | QTY | ORIGIN | ORDERID |
|---|---|---|---|---|
| 25.65 | 001 | 200 | L | CLORD11 |
| 25.65 | 100 | 150 | ACCTA3 | CLORD12 |

Since the incoming order is flagged as being IMU eligible, the potential contras are filtered based on any that are also IMU eligible, specifically those IMUs that ACCTA2 is authorized to participate in. The only potential contra that is also eligible for IMU processing is CLORD12 entered by ACCTA3. However, since ACCTA2 and ACCTA3 are not participating in a defined IMU, this order is excluded as a potential contra. In addition, since the standing order CLORD12 is flagged as being an IMU Only order, it is subsequently removed from consideration for MTF processing.

Due to these conditions, only a single potential contra order remains for consideration. Since only one potential contra remains, no Venue-based best execution cost calculation is performed.

| LIMIT | FLAGS | QTY | ORIGIN | ORDERID |
|---|---|---|---|---|
| 25.65 | 001 | 200 | L | CLORD11 |

Order is FILLED against L's standing order CLORD11 for a quantity of 50 at the price 25.65.

| BID | | | | | ASK | | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD41 | ACCTA2 | 50 | 111 | 25.65 | 25.65 | 100 | 50 | L | CLORD11 |

The standing order CLORD11's quantity is reduced by 50 shares to show a total available quantity of 150 shares. Its position within the standing book, based on entered time, is not modified by this adjustment. Following these transactions, the standing book appears as follows:

| INSTRUMENT: AAAA • BASE CCY: GBP | | | | | | | | | |
|---|---|---|---|---|---|---|---|---|---|
| BID | | | | | ASK | | | | |
| ORDERID | ORIGIN | QTY | FLAGS | LIMIT | LIMIT | FLAGS | QTY | ORIGIN | ORDERID |
| CLORD01 | ACCTA1 | 100 | 111 | 25.35 | 25.65 | 001 | 150 | L | CLORD11 |
| CLORD02 | L | 50 | 001 | 25.35 | 25.65 | 100 | 150 | ACCTA3 | CLORD12 |
| CLORD03 | ST | 200 | 001 | 25.35 | 25.70 | 110 | 100 | ACCTA4 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 001 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

Notification of the executions is communicated to the participating clients and authorized feed subscribers.

Example 5

This example demonstrates basic handling of an incoming Sell order which overrides default Account preferences. In this example, ACCTA1 submits order to SELL 150 shares of AAAA trading in GBP at a Limit price of 25.65. The order is flagged as being eligible for IMU Only (note that while the account is authorized to participate in all OpenMatch features, the individual order is flagged as being an IMU Only order which overrides Account settings).

The standing order book at the time the incoming order is entered into the system appears as follows:

| INSTRUMENT: AAAA • BASE CCY: GBP ||||||||||
|---|---|---|---|---|---|---|---|---|---|
| BID |||||  ASK |||||
| ORDERID | ORIGIN | QTY | FLAGS | LIMIT | LIMIT | FLAGS | QTY | ORIGIN | ORDERID |
| CLORD01 | ACCTA2 | 100 | 111 | 25.35 | 25.65 | 001 | 200 | L | CLORD11 |
| CLORD02 | L | 50 | 001 | 25.35 | 25.65 | 100 | 150 | ACCTA3 | CLORD12 |
| CLORD03 | ST | 200 | 001 | 25.35 | 25.70 | 110 | 100 | ACCTA4 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 001 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

While potentially containing additional attributes, the incoming order contains the following information:

| ORDERID | ACCTID | INSTRUMENT | QTY | TYPE | SIDE | PX | FLAGS |
|---|---|---|---|---|---|---|---|
| CLORD51 | ACCTA1 | AAAA | 150 | Limit | Sell | 25.30 | 100 |

Based on the status of the standing book, seven potential contra orders are identified based on price eligibility:

| ORDERID | ORIGIN | QTY | FLAGS | LIMIT |
|---|---|---|---|---|
| CLORD01 | ACCTA2 | 100 | 111 | 25.35 |
| CLORD02 | L | 50 | 001 | 25.35 |
| CLORD03 | ST | 200 | 001 | 25.35 |
| CLORD04 | ACCTA3 | 250 | 100 | 25.30 |
| CLORD05 | ST | 150 | 001 | 25.30 |
| CLORD06 | ACCTA4 | 50 | 110 | 25.30 |
| CLORD07 | ACCTA2 | 100 | 111 | 25.30 |

Since an opportunity for price improvement exists (23.35) than submitted with the order (23.30), the standing orders at this improved price point are processed first.

| ORDERID | ORIGIN | QTY | FLAGS | LIMIT |
|---|---|---|---|---|
| CLORD01 | ACCTA2 | 100 | 111 | 25.35 |
| CLORD02 | L | 50 | 001 | 25.35 |
| CLORD03 | ST | 200 | 001 | 25.35 |

Since the incoming order is flagged as being IMU eligible, the potential contras are filtered based on any that are also IMU eligible, specifically those IMUs that ACCTA1 is authorized to participate in (IMUA1 and IMUA2):

| ORDERID | ORIGIN | QTY | FLAGS | LIMIT |
|---|---|---|---|---|
| CLORD01 | ACCTA2 | 100 | 111 | 25.35 |

Incoming order is PARTIALLY FILLED against ACCTA2's standing order CLORD01 for a quantity of 100 at the price 25.35.

| BID ||||| ASK |||||
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD01 | ACCTA2 | 100 | 111 | 25.35 | 25.35 | 100 | 100 | ACCTA3 | CLORD51 |

The standing order CLORD01 is removed from the standing book as completely FILLED.

From the incoming order a quantity of 50 remains to be managed. The remaining standing orders that are price eligible are processed to be valid contra orders.

| ORDERID | ORIGIN | QTY | FLAGS | LIMIT |
|---|---|---|---|---|
| CLORD02 | L | 50 | 001 | 25.35 |
| CLORD03 | ST | 200 | 001 | 25.35 |

While two standing orders remain at the improved price point, neither of those orders are eligible for IMU processing. Considering the incoming order is flagged as being IMU Only, no additional executions can be performed at this improved price point. Since all standing orders at the improved price point have been verified, the remaining standing orders that are price eligible are processed. Based on previous activity, four possible contra orders exist within the standing book:

| ORDERID | ORIGIN | QTY | FLAGS | LIMIT |
|---------|--------|-----|-------|-------|
| CLORD04 | ACCTA3 | 250 | 100 | 25.30 |
| CLORD05 | ST | 150 | 001 | 25.30 |
| CLORD06 | ACCTA4 | 50 | 110 | 25.30 |
| CLORD07 | ACCTA2 | 100 | 111 | 25.30 |

Since the incoming order is flagged as being IMU eligible, the potential contras are filtered based on any that are also IMU eligible, specifically those IMUs that ACCTA1 is authorized to participate in (IMUA1 and IMUA2):

| ORDERID | ORIGIN | QTY | FLAGS | LIMIT |
|---------|--------|-----|-------|-------|
| CLORD04 | ACCTA3 | 250 | 100 | 25.30 |
| CLORD06 | ACCTA4 | 50 | 110 | 25.30 |
| CLORD07 | ACCTA2 | 100 | 111 | 25.30 |

From these available IMU eligible contra orders, these are reordered based on the Account Preference Priority assigned by the Account holder or authorized OpenMatch Administrator. When more than one Account is assigned the same priority then these orders maintain their original time entry priority.

IMU Account Contra Preference Priority Calculation

ACCTA1 contra account preference settings

ACCTA2 priority=1

ACCTA3 priority=1

ACCTA4 priority=2

Applying these results in the following priority order:

| ORDERID | ORIGIN | QTY | FLAGS | LIMIT |
|---------|--------|-----|-------|-------|
| CLORD06 | ACCTA4 | 50 | 110 | 25.30 |
| CLORD04 | ACCTA3 | 250 | 100 | 25.30 |
| CLORD07 | ACCTA2 | 100 | 111 | 25.30 |

The incoming order is FILLED against ACCTA4's standing order CLORD06 for a quantity of 50 at the price 25.30. The standing order CLORD06 is removed from the standing book as completely FILLED.

| BID | | | | | ASK | | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD06 | ACCTA4 | 50 | 110 | 25.30 | 25.30 | 111 | 50 | ACCTA1 | CLORD51 |

Following this transaction, the complete quantity of the incoming order has been completely fulfilled.

The processing of the incoming order CLORD51 resulted in the executions in the following order.

| BID | | | | | ASK | | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD01 | ACCTA2 | 100 | 111 | 25.35 | 25.35 | 111 | 100 | ACCTA1 | CLORD51 |
| CLORD06 | ACCTA4 | 50 | 110 | 25.30 | 25.30 | 111 | 50 | ACCTA1 | CLORD51 |

Following these executions, the standing book appears as follows:

| INSTRUMENT: AAAA • BASE CCY: GBP | | | | | | | | | |
|---|---|---|---|---|---|---|---|---|---|
| BID | | | | | ASK | | | | |
| ORDERID | ORIGIN | QTY | FLAGS | LIMIT | LIMIT | FLAGS | QTY | ORIGIN | ORDERID |
| CLORD02 | L | 50 | 001 | 25.35 | 25.65 | 001 | 200 | L | CLORD11 |
| CLORD03 | ST | 200 | 001 | 25.35 | 25.65 | 100 | 150 | ACCTA3 | CLORD12 |
| CLORD04 | ACCTA3 | 250 | 100 | 25.30 | 25.70 | 110 | 100 | ACCTA4 | CLORD13 |
| CLORD05 | ST | 150 | 001 | 25.30 | 25.72 | 001 | 200 | ST | CLORD14 |
| CLORD07 | ACCTA2 | 100 | 111 | 25.30 | 25.72 | 001 | 100 | L | CLORD15 |
| | | | | | 25.72 | 111 | 100 | ACCTA2 | CLORD16 |
| | | | | | 25.72 | 111 | 50 | ACCTA1 | CLORD17 |

Notification of the executions is communicated to the participating clients and authorized feed subscribers.

Example 6

This example demonstrates basic handling of an incoming Buy order which executes at both an IMU and MTF level. In this example, ACCTA4 submits order to BUY 100 shares of AAAA trading in GBP at a Limit price of 25.70. The order is flagged as being eligible for IMU and MTF but not for Venue Best Execution calculations. (note that while the Account is authorized to participate in all OpenMatch features, the individual order is flagged as being an IMU Only order which overrides Account settings).

The standing order book at the time the incoming order is entered into the system appears as follows:

| INSTRUMENT: AAAA • BASE CCY: GBP | | | | | | | | | |
|---|---|---|---|---|---|---|---|---|---|
| BID | | | | | ASK | | | | |
| ORDERID | ORIGIN | QTY | FLAGS | LIMIT | LIMIT | FLAGS | QTY | ORIGIN | ORDERID |
| CLORD01 | ACCTA2 | 100 | 111 | 25.35 | 25.70 | 001 | 200 | L | CLORD11 |
| CLORD02 | L | 50 | 001 | 25.35 | 25.70 | 100 | 150 | ACCTA3 | CLORD12 |
| CLORD03 | ST | 200 | 001 | 25.35 | 25.70 | 110 | 100 | ACCTA2 | CLORD13 |
| CLORD04 | ACCTA3 | 250 | 100 | 25.30 | 25.72 | 001 | 200 | ST | CLORD14 |
| CLORD05 | ST | 150 | 001 | 25.30 | 25.72 | 100 | 100 | L | CLORD15 |
| CLORD06 | ACCTA4 | 50 | 110 | 25.30 | 25.72 | 111 | 100 | ACCTA2 | CLORD16 |
| CLORD07 | ACCTA2 | 100 | 111 | 25.30 | 25.72 | 111 | 50 | ACCTA1 | CLORD17 |

While potentially containing additional attributes, the incoming order contains the following information:

| ORDERID | ACCTID | INSTRUMENT | QTY | TYPE | SIDE | PX | FLAGS |
|---|---|---|---|---|---|---|---|
| CLORD61 | ACCTA4 | AAAA | 100 | Limit | Buy | 25.70 | 110 |

Based on the status of the standing book, three potential contra orders are identified based on price eligibility:

| LIMIT | FLAGS | QTY | ORIGIN | ORDERID |
|---|---|---|---|---|
| 25.70 | 001 | 200 | L | CLORD11 |
| 25.70 | 100 | 150 | ACCTA3 | CLORD12 |
| 25.70 | 110 | 100 | ACCTA2 | CLORD13 |

Since the incoming order is flagged as being IMU eligible, the potential contras are filtered based on any that are also IMU eligible, specifically those IMUs that ACCTA4 is authorized to participate in (IMUA2):

| LIMIT | FLAGS | QTY | ORIGIN | ORDERID |
|---|---|---|---|---|
| 25.70 | 100 | 150 | ACCTA3 | CLORD12 |
| 25.70 | 110 | 100 | ACCTA2 | CLORD13 |

Since neither of the Accounts which submitted the potential contra orders (ACCTA3 or ACCTA2) have authorization to trade in IMUA2 with ACCTA4, neither of these are eligible to perform an IMU transaction.

The initial list of potential contra orders is filtered for determination of eligible MTF contra orders of which only one was identified:

| LIMIT | FLAGS | QTY | ORIGIN | ORDERID |
|---|---|---|---|---|
| 25.70 | 110 | 100 | ACCTA2 | CLORD13 |

Incoming order is FILLED against ACCTA2's standing order CLORD13 for a quantity of 100 at the price 25.70.

| BID | | | | | ASK | | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD61 | ACCTA4 | 100 | 110 | 25.70 | 25.70 | 100 | 110 | ACCTA2 | CLORD13 |

The standing order CLORD13 is removed from the standing book as completely FILLED.

The processing of the incoming order CLORD61 resulted in the executions in the following order.

| | BID | | | | | ASK | | | |
|---|---|---|---|---|---|---|---|---|---|
| ORDERID | ORIGIN | VOLUME | FLAGS | LIMIT | LIMIT | FLAGS | VOLUME | ORIGIN | ORDERID |
| CLORD61 | ACCTA4 | 100 | 110 | 25.70 | 25.70 | 100 | 110 | ACCTA2 | CLORD13 |

Following these executions, the standing book appears as follows:

| INSTRUMENT: AAAA • BASE CCY: GBP | | | | | | | | | |
|---|---|---|---|---|---|---|---|---|---|
| | BID | | | | | ASK | | | |
| ORDERID | ORIGIN | QTY | FLAGS | LIMIT | LIMIT | FLAGS | QTY | ORIGIN | ORDERID |
| CLORD01 | ACCTA2 | 100 | 111 | 25.35 | 25.70 | 001 | 200 | L | CLORD11 |
| CLORD02 | L | 50 | 001 | 25.35 | 25.70 | 100 | 150 | ACCTA3 | CLORD12 |
| CLORD03 | ST | 200 | 001 | 25.35 | 25.72 | 001 | 200 | ST | CLORD14 |
| CLORD04 | ACCTA3 | 250 | 100 | 25.30 | 25.72 | 001 | 100 | L | CLORD15 |
| CLORD05 | ST | 150 | 001 | 25.30 | 25.72 | 111 | 100 | ACCTA2 | CLORD16 |
| CLORD06 | ACCTA4 | 50 | 110 | 25.30 | 25.72 | 111 | 50 | ACCTA1 | CLORD17 |
| CLORD07 | ACCTA2 | 100 | 111 | 25.30 | | | | | |

Notification of the executions is communicated to the participating clients and authorized feed subscribers.

The system monitor 1008 is further operable to manage physical operations of the overall system. It also enables clients and the system vendors to perform the business and administrative tasks as required, for example: system health checks and monitoring; start/stop any subsystem or module; gather information from any subsystem or module; provide a centralised alert reporting facility; provide real-time processing updates; halt/release an instrument; add/correct an account; suspend/release an account; surveillance e.g. audit trails of client access, provide order history, execution activity, etc.; notify or log specific activities as they occur.

At all stages in the transaction cycle, whether IMU, MTF or BX Router-based, a system monitor module 1008 is notified by all of the other elements of the transaction computer system of the status of the transaction so that inquiries may be easily and rapidly dealt with. It also generates the data used for reporting sent via administrative tools 130.

The server 102 may further comprise a block trading facility (BTF) 820. Block trades (also known as block orders) comprise large buy and sell orders privately negotiated away from the public market. The BTF is configured to receive block client orders and initiate each of the sub-processes 108, 1002 as necessary to satisfy the order.

Those skilled in the art will appreciate that while this disclosure has described what is considered to be the best mode and, where appropriate, other modes of performing the invention, the invention should not be limited to the specific configurations and methods disclosed in this description of the preferred embodiment.

Those skilled in the art will recognise that the invention has a broad range of applications in many different types of transactions involving financial instruments, and that the embodiments of the present invention described in this disclosure may take a wide range of modifications without departing from the inventive concept as defined in the appended claims. For example, although the system has been described for trading financial instruments, it is also possible for embodiments of the invention to enable trading of other fungible assets.

The invention claimed is:

1. A Computer apparatus configured to process transactions in fungible assets on behalf of account holders on a client controlled, order by order basis, via account controlled and configured private books of business and public books, and to proactively route public orders to external venues based on analysis of account-specific best execution configurations including venue cost assignments and account-specific venue routing parameters, the apparatus being provided with a matching engine including an internalised matching utility for conducting transactions on account defined private books of business, in addition to public books of business, the computer apparatus comprising:

operation files comprising configuration information including account holder rules and preferences, and wherein said rules comprise definitions of private book relationships defined in terms of eligible private book counterparties per account holder identity;

an operation file configuration interface configured to establish private book relationships and define deal criteria applying between eligible private book counterparties;

a volatile memory configured for receiving and holding in-memory book of business data, including private book data, market data from external venues, and other relevant data based on information in orders;

a matching engine comprising an internalised matching utility processor configured to parse the private book data in the volatile memory according to account holder rules and preferences.

2. The apparatus according to claim 1, further comprising an account holder interface module configured to receive orders from a remote account holder computer with the ability to determine the originating account holder, order type, and eligibility for one or more of the following predetermined order scopes including: private book, public book, and proactive routing to external venue.

3. The apparatus according to claim 2, wherein the account holder interface couples to the operation file configuration interface enabling account holders to configure the operation files, at least in part.

4. The apparatus according to claim 3, further comprising an administration interface coupled to the operation file configuration interface enabling system administrators to configure the operation files, at least in part.

5. The apparatus according to claim 1, further comprising an order management module configured to determine eligible order scopes and pass order data to relevant components of the apparatus in dependence on the determination, the order management module comprising a set of order scope detectors, wherein the order is determined to be eligible as a private book order from account holder preferences and by detecting a private book flag among order scope detectors, the private book order is passed to the internalised matching utility (IMU) processor for handling.

6. The apparatus according to claim 1, further comprising a book manager module with access to an in-memory book datastore comprising private book configuration and account preference data per account holder, and operable to call book of business data, including where appropriate private book data, into the volatile memory for processing based on said configuration including the account holder identity and eligible private book counterparties information.

7. The apparatus according to claim 1, wherein the matching engine comprises a Multilateral Trading Facility (MTF) processor, such that if the order is not fully transacted by the IMU processor and is determined by the order management module specified in claim 5 to be eligible as a public book order from account holder preferences and by detecting a public book flag among order scope detectors, public book data from account holder in volatile memory is parsed by the MTF processor according to account holder rules and preferences in the operation files.

8. The apparatus according to claim 1, wherein a set of control functions are provided to determine criteria based on account holder input for which the exposure scope of an order exposed to only the private book can be changed to include exposure in the public book; and for which the exposure scope of a public order can be changed to remove exposure within the public book.

9. The apparatus according to claim 1, wherein the matching engine comprises a best execution routing processor such that if the public order is not fully transacted by the MTF processor and is determined by the order management module specified in claim 5 to be eligible for best execution routing from account holder preferences and by detecting a proactive route flag among order scope detectors, external venue data in the volatile memory is parsed by the best execution routing processor according to account holder rules and preferences in the operation files.

10. The apparatus according to claim 1, wherein the operation files additionally comprise configuration information by account holder relating to one or more of: speed of execution; likelihood of execution; likelihood of settlement; price; likelihood of price improvement; venue data; costs by venue; costs by transaction type; settlement data; settlement cost data; venue routing parameters; a combination of any of the aforementioned.

11. The apparatus according to claim 1, comprising a control function operable to generate relevant configuration information prior to and during a trading session and store it within the memory data store as well as the operation files.

12. The apparatus according to claim 1, wherein the order management module comprises a request processor configured to determine order type and order scope(s) and to provide order data to relevant components of the apparatus, and an order processor configured to provide order data to relevant components within or associated with the apparatus.

13. The apparatus according to claim 1, further comprising a best execution cost engine, capable of accessing orders of two or more eligible counterparties based on account configuration and cost information contained within the operation files.

14. The apparatus according to claim 13, comprising a best execution cost engine operable to determine a synthetic transaction value for a proposed transaction for an account holder, taking into consideration account holder costs relating to a particular counter-party and/or a particular venue based on account specific configuration data.

15. The apparatus according to claim 14, wherein a set of control functions are provided to determine criteria based on account holder input for which the exposure scope of an order exposed to only the public book and private book can be changed to include eligibility for proactive routing; and for which the exposure scope of an order eligible to be proactively routed can be changed to remove eligibility for proactive routing.

16. The apparatus according to claim 15, further comprising an integrator module configured to call operation files and to distribute information from within said operation files to components of the system.

17. The apparatus according to claim 16, comprising a settlement management module operable to administer charges to account holders for a private or public book transaction.

18. The apparatus according to claim 17, further comprising a disseminator module configured to publish particulars of transactions handled by the apparatus.

19. The apparatus according to claim 18, wherein said operation files configuration interface is configured to assist a user in entering rules and/or preferences relating to one or more of: account holder speed of execution preferences; account holder likelihood of execution preferences; venue preferences; account holder costs by venue; account holder costs by transaction type; account holder response to price improvement indications; settlement cost information; account holder settlement preferences; a combination of any of the aforementioned.

20. A method of operating a computer apparatus configured to process transactions in fungible assets on behalf of account holders via private and public books of business, as well as proactively route orders to external venues based on best execution analysis for the account holder and account holder configuration, the apparatus being provided with a matching engine including an internalised matching utility for conducting transactions on private books of business, in addition to public books business, the method comprising:
  receiving an order from a remote account holder computer with the ability to determine the originating account holder and eligibility for one or more of a number of predetermined order scopes including a private book type of order, public book type of order, and proactive routing to external venue;
  determining order type and order scope(s) and providing order data to relevant components of the apparatus in dependence on the determination, in the case of the order being eligible as a private book the order passing the order to an internalised matching utility processor for handling;
  loading book of business data including, where appropriate, private book data and market data from external venues into a volatile memory for processing based on configuration information maintained in operation files, said information including account holder identity and eligible private book counterparties per account holder; and operating a matching engine comprising an internalised matching utility processor to parse private book data in the volatile memory according to account holder rules and preferences in said operational files; and operating a matching engine comprising a best execution analysis processor to parse eligible proactive route orders and route to determined external venues based on account holder rules and preferences in said operational files; and conducting a transaction pursuant to the received order.

21. A computer readable medium encoded with computer code, which, when loaded onto a computer, causes the computer to become capable of processing transactions in fungible assets on behalf of account holders via private and public books of business, as well as proactively route orders to external venues based on best execution analysis for an account holder based on account preferences and order data, the computer code encoding a matching engine including an internalised matching utility for conducting transactions on private books of business, in addition to public books business, the code comprising code to cause the computer to:

receive an order from a remote account holder computer with the ability to determine the originating account holder and eligibility for one or more of a number of predetermined order scopes including a private book type of order, public book type of order, and proactive routing to external venue;

determine order type and order scopes and pass order data to relevant components of the apparatus in dependence on the determination, in the case of the order being a private book order passing the order to an internalised matching utility processor for handling;

load book of business data including, where appropriate, private book data and market data from external venues into a volatile memory for processing based on configuration information in operation files, said information including account holder identity and eligible private book counterparties per account holder; and operate a matching engine comprising an internalised matching utility processor to parse private book data in the volatile memory according to account holder rules and preferences in said operational files; and operate a matching engine comprising a best execution analysis processor to parse eligible proactive route orders and route to determined external venues based on account holder rules and preferences in said operational files; and conduct a transaction pursuant to the order.

22. An alternative trading system, utilizing the code of claim 21, said alternate trading system capable of processing internalised transactions conducted in private on behalf of account holders, public transactions conducted via a multilateral trading facility, and proactively route public orders to external venues based best execution analysis in accordance to account holder configuration and preferences, the trading system comprising:

a matching engine comprising an internalised matching utility processor, a multilateral trading facility processor, and a best execution router processor;

an order management module operable to receive and decode orders from account holders with the ability to determine the originating account holder and eligibility for one or more of a number of predetermined order scopes: private, public, and proactive, said order management module being further operative to supply order data to an appropriate one or more of the processors of the matching engine in dependence on said decoding;

said matching engine being configured to parse book data and/or venue data in the volatile memory according to account holder rules and preferences, such that private orders are processed by the internalised matching utility from among possible transactions within private books of eligible private counterparties, public orders are processed by the multilateral trade facility from among possible transactions within public books available via the multilateral trade facility, and proactive orders are processed by the best execution router processor from among all available external venue data.

* * * * *